US006835805B2

(12) United States Patent
Kathirgamanathan et al.

(10) Patent No.: US 6,835,805 B2
(45) Date of Patent: Dec. 28, 2004

(54) POLYMERS

(75) Inventors: Poopathy Kathirgamanathan, Middlesex (GB); Subramaniam Ganeshamurugan, London (GB)

(73) Assignee: Nissan Chemical Industries Limited, Tokyo (JP)

( * ) Notice: Subject to any disclaimer, the term of this patent is extended or adjusted under 35 U.S.C. 154(b) by 273 days.

(21) Appl. No.: 09/991,649

(22) Filed: Nov. 26, 2001

(65) Prior Publication Data

US 2002/0095013 A1 Jul. 18, 2002

(30) Foreign Application Priority Data

Nov. 28, 2000 (GB) .............................................. 0028973

(51) Int. Cl.$^7$ ........................ C08G 73/00; C08F 283/00
(52) U.S. Cl. .................. 528/502 E; 528/422; 528/486; 525/540; 428/423.1
(58) Field of Search ............................ 528/502 E, 422, 528/486; 525/540; 428/423.1

(56) References Cited

U.S. PATENT DOCUMENTS

| | | | |
|---|---|---|---|
| 3,301,827 A | 1/1967 | Martin | |
| 4,102,873 A | 7/1978 | Griffith et al. | |
| 6,153,726 A | 11/2000 | Kathirgamanathan et al. | |
| 6,441,124 B1 | 8/2002 | Kathirgamanathan et al. | |

FOREIGN PATENT DOCUMENTS

| | | |
|---|---|---|
| EP | 0 053 937 | 6/1982 |
| EP | 0 295 676 | 12/1988 |
| GB | 2 350 617 | 12/2000 |

OTHER PUBLICATIONS

U.S. Appl. No. 09/991,649, Kathirgamanathan et al., filed Nov. 26, 2001.
Chemical Abstract, AN 1985–213158 (35), JP 60–135420, Jul. 18, 1985.
Chemical Abstract, AN 1985–213157 (35), JP 60–135419, Jul. 18, 1985.
Chemical Abstract, AN 1985–084684 (14), JP 60–036519, Feb. 25, 1985.
M. A. Rabjohns, et al., Abstract of Polymer, vol. 38, No. 13, pp. 3395–3407, "Synthesis of Aromatic Polyamides Containing Anthracene Units Via a Precursor Polymer Approach", 1997.
R. N. Nurmukhametov, et al., Abstract of Zh. Fiz. Khim., vol. 70, No. 10, pp. 1839–1843, "Effect of Substituents on Luminescence Spectral Properties of 9, 10–Diphenylanthracene Derivatives", 1996.
A. H. Frazer, et al., Abstract of J. Polym. Sci., Polym. Chem. Ed., vol. 23, No. 11, pp. 2779–2790, "Polyamides from 2, 6 (7)–Diamino–9, 10–Dihydro–9, 10–Ethanoanthracene and 2, 6 (7)–Diaminoanthracene", 1985.
Chemical Abstract, AN 91–129168 (18), JP 3–068623, Mar. 25, 1991.

(List continued on next page.)

*Primary Examiner*—Duc Truong
(74) *Attorney, Agent, or Firm*—Oblon, Spivak, McClelland, Maier & Neustadt, P.C.

(57) ABSTRACT

A method of production of a homopolymer or copolymer or homo-oligomer or co-oligomer product characterised in that the product is obtained by condensation reaction of a diaminoanthracene, substituted or not, optionally with a diiminoanthracene substituted or not in the absence of anthraquinone substituted or not.

35 Claims, 24 Drawing Sheets

OTHER PUBLICATIONS

C. I. Simonescu, et al., Revue Roumaine de Chimie, XP–002121180, vol. 39, No. 3, pp. 333–338, "On the Chemical Polymerization of Some Aromatic Amines", 1994.

Doo–Kyung Moon, et al., *Macromolecules, XP–000412416, vol. 26, No. 25, pp. 6992—6997,* "Synthesis of Poly(1–Aminonaphthalene) and Poly(1–Aminoanthracene) by Chemical Oxidative Polymerization and Characterization of the Polymers", Dec. 6, 1993.

R. C. Faria, et al., Electrochimica Acta, XP–004153734, vol. 44, No. 10, pp. 1597—1605, "Synthesis and Electromemical Response of Poly–(1–Aminoanthracene) Films", 1999.

Simionescu, et al. XP–002121180, "On the Chemical Polymerization of Some Aromatic Amines", Revue Roumaine de Chimie, 1994, pp. 333–338.

Moon, et al., XP–000412416, "Synthesis of Poly(1–aminonaphthalene) and Poly(1–aminoanthracene) by Chemical Oxidative Polymerization and Characterization of the Polymers", 1993 American Chemical Society, Macromolecules, vol. 26, No. 25, 1993, pp. 6992–6997.

Faria, et al., "Synthesis and electrochemical response of poly–(1–aminoanthracene) films", Electrochimica Acta (1999), pp. 1597–1605.

JP60135420 A, Jul. 18, 1985, "Production of Chelating Resin" (Abstract only).

JP60135419 A, Jul. 18, 1985, "Production of Chelating Resin" (Abstract only).

JP60036519 A, Feb. 25, 1985, "Chelate Resin" (Abstract only).

Rabjohns, et al., Polymer (1997), 38(13), pp. 3395–3407, "Synthesis of aromatic polyamides containing anthracene units via a precursor polymer approach", (Abstract only).

Nurmukhametov, et al., Zh. Fiz. Khim. (1996), 70(10), pp. 1839–1843, "Effect of substituents on luminescence spectral properties of 9, 10–diphenylanthracene derivatives", (Abstract only).

Frazer, et al., J. Polym. Sci., Polym. Chem. Ed. (1985), 23(11), pp. 2779–2790, "Polyamides from 2,6(7)–diamino–9, 10–dihydro–9, 10–ethanoanthracene and 2, 6(7)–diaminoanthracene", (Abstract only).

JP3068623 A, Mar. 25, 1991, "Production of Anthracene Polyester", (Abstract only).

Great Britain Search Report dated May 30, 2002.

Great Britain Search Report dated Feb. 26, 2001.

Great Britain Search Report dated Sep. 20, 2000.

European Search Report dated Mar. 13, 2000.

Great Britain Search Report dated Sep. 24, 1999.

POLYMERS

The present invention relates to self polymerisation products of diamino anthracenes (DAA) and polymerisation of DAA with diiminoanthracenes (DIA). In particular, the invention relates to homopolymers or co-polymers of 9,10 diaminoanthracene or substituted DAA or DIA or substituted DIA. The polymerisation products may be polymers or oligomers (e.g. of 2 to 12 or 15 repeat units) and the processes of the present invention enables homopolymers and co-polymers to be made with many variations in structure and in the substituents which are attached to the anthracene backbone, but with little variation in the backbone itself. The polymers and co-polymers can be expected on reduction to produce materials which are electroconductive.

They may also be sufficiently transparent to be used in thin film applications where they may be used as transparent coatings, used extensively in displays, e.g. electroluminescent and liquid crystal displays and to some extent in electromagnetic shielding windows. The polymers and copolymers disclosed herein can be used in antistatic applications.

Polymers of aniline and applications thereof have been known for many years. Poly (1-aminoanthracene) (P1-AA hereafter) has also been described (Takakazu Yamamoto et al., *Macromolecules*, 1993, 26, pages 6992–6997). These polymers have similar structures to poly(aniline) and are dark coloured, varying from bluish-black, brown to brown-black powders. Yamamoto states P1-AA has conductivity of the order of $1 \times 10^{-4}$ S cm$^{-1}$. P1-AA is stated by Yamamoto to be soluble in organic solvents such as HCOOH, DMF, DMSO and NMP, slightly soluble in CHCl$_3$ and THF, and insoluble in CH$_3$OH, C$_2$H$_5$OH, CH$_3$CN, benzene and toluene. Yamamoto gives no indication of the transparency of P1-AA.

The applicants are also aware of two articles namely A. Everaerts et al., *Polym. Prepr.* (*J. of Polymer Science; Part A*: Polym. Chem.) 24 (7)pp 1703–16 (1986) (hereafter Everaerts) and P. A. Williams et al, *Macromolecules* 26 (21) pp5820–1 (1993) (hereafter Williams).

The present inventors have been seeking to develop a conductive polymer or oligomer of sufficient transparency to enable it to be used where light transmission as well as conductivity is required, and in addition solubility which would facilitate fabrication into useful structures, such as films, by solvent methods. In contrast to P1-AA we have discovered surprisingly that certain polymerisation products of 9,10 diaminoanthracene are sufficiently transparent and soluble to be useful electroconductive polymers.

These products may exhibit a particular advantage over the transparent Indium Tin Oxide (ITO) films currently employed in transparent coatings. The ITO coatings lose most or all of their electroconductivity if the surface is bent. However, the products according to the present invention can be expected to maintain their electroconductivity even when bent.

In addition the present inventors wished to devise a procedure by which polymers could be provided in which the polymer backbone was constant or subject to little variation and significant flexibility was provided for varying the substitution on the backbone.

According to one aspect of the invention a method of production of a homopolymer or copolymer or homo-oligomer or co-oligomer product is characterised in that the product is obtained by condensation by fusion in a sealed vessel or space of a diaminoanthracene, substituted or not, optionally with a diiminoanthracene substituted or not, in the absence of any solvent and in the absence of anthraquinone substituted or not.

According to another aspect of the present invention, there is provided a polymeric or oligomeric product obtainable from the reaction of an aromatic diamine with itself or a substituted form thereof or with a diimino version or a substituted version thereof, characterised in that the diamine is a diamino anthracene which is substituted or is not substituted, and the diimine is diiminoanthracene which is substituted or not, and in that the reaction is by melting under vacuum, in the absence of solvent and in the absence of anthraquinone whether substituted or not.

The substitution may be such that the product is a homopolymer or homo-oligomer, or the substitution may be such that the product is a co-polymer or a co-oligomer.

The diaminoanthracene is preferably a 9,10-diaminoanthracene, which may be substituted or not.

The sole reactant may be DAA or the only reactants may be DAA and DIA, or the only reactants may be one or more substituted DAAs and DAA.

or the only reactants may be substituted DAAs which may be the same or different.

or the only reactants may be one or more substituted DAAs and DIA.

or the only reactants may be DAA and one or more substituted DIAs.

or the only reactants may be one or more substituted DAAs and one or more substituted DIAs.

The ratio of DAA to DIA may be in the range 5:1 to 1:5, preferably in the range 3:1 to 1:3, and more preferably in the range 2:1 to 1:2.

The product produced by the method of the present invention preferably has the general formula I (see FIG. 10 of the accompanying drawings)

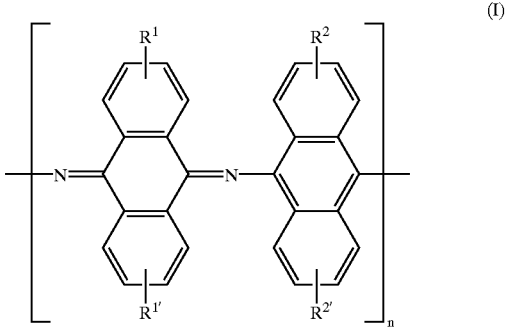

(I)

where, $R^1$ may be the same as or different to $R^{1'}$, which may be the same as or different to $R^2$, which may be the same as or different to $R^{2'}$ and each of $R^1$, $R^{1'}$, $R^2$, and $R^{2'}$ is a hydrogen atom or —CH$_3$, CH$_3$CH$_2$—, —OCH$_3$, —OCH$_2$CH$_3$, —CH$_2$OCH$_3$, —CH$_2$OCH$_2$CH$_2$OCH$_3$, methoxyethoxyethoxymethyl, aryloxymethyl, phenyl, Cl, Br, CN or NO$_2$, —CH$_2$COOR''' or —CH$_2$NHCOR''' (where R''' is C$_1$–C$_6$ alkyl or a phenyl or biphenyl group), or a C$_1$–C$_5$ alkyl group, or an aryl group e.g. a benzyl group, or an —SO$_3$H group or a hydroxyl group or a C$_1$–C$_5$ alkoxy group or an H$_2$PO$_3$ group, and $R^1$ and $R^{1'}$ are different to $R^2$ and $R^{2'}$ and n is an integer ranging from 2 to 100 preferably 5 to 100, more preferably 6–20.

Alternatively the product may have the general formula I

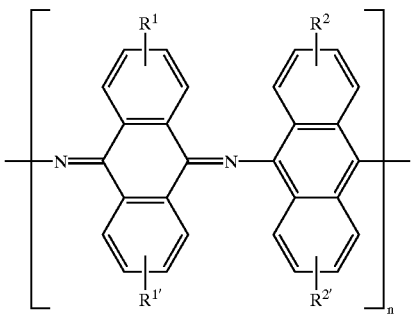

(I)

where, $R^1$ may be the same as or different to $R^{1'}$, and each of $R^1$ and $R^{1'}$ is a hydrogen atom or —$CH_3$, $CH_3CH_2$—, —$OCH_3$, —$OCH_2CH_3$, —$CH_2OCH_3$, —$CH_2OCH_2CH_2OCH_3$, methoxyethoxyethoxymethyl, aryloxymethyl, phenyl, Cl, Br, CN or $NO_2$, —$CH_2COOR'''$ or —$CH_2NHCOR'''$ (where R''' is $C_1$–$C_6$ alkyl or a phenyl or biphenyl group), and $R^2$ may be the same or different to $R^{2'}$ and each of $R^2$ and $R^{2'}$ is a hydrogen atom or a $C_1$–$C_5$ alkyl group, or an aryl group e.g. a benzyl group, or an —$SO_3H$ group or a hydroxyl group or a $C_1$–$C_5$ alkoxy group or an $H_2PO_3$ group, and $R^1$ and $R^{1'}$ are different to $R^2$ and $R^{2'}$ and n is an integer ranging from 2 to 100 preferably 5 to 100, more preferably 6–20.

$R^1$ may be the same as $R^{1'}$ but may be different from $R^2$ and $R^{2'}$ and $R^2$ and $R^{2'}$ may be the same;

or $R^1$ may be the same as $R^{1'}$ and as $R^2$ and $R^{2'}$ but is not hydrogen;

or $R^1$ may be different from $R^{1'}$ and $R^2$ may be different from and $R^{2'}$ and $R^1$ and $R^{1'}$ may both be different from $R^2$ and $R^{2'}$;

or that $R^1$ and $R^2$ are not hydrogen and $R^1$ and $R^{2'}$ are not the same.

The DAA may be substituted with a single substituent e.g. a $C_1$–$C_5$ alkyl, an aryl e.g. a benzyl group, an —$SO_3H$ or —OH, or $C_1$–$C_5$ alkoxy, or aryloxy, e.g. phenoxy or substituted phenoxy or biphenyloxy group or an $H_2PO_3$ group or with more than one substituent.

In a preferred embodiment of the invention the fusion reaction is carried out in a sealed space e.g. a sealed ampoule containing equimolar proportions of 9,10-diaminoanthracene and 9,10-diiminoanthracene e.g. at 200° C. for 4 hours under vacuum as shown in reaction Scheme 1 given in the drawings as FIG. 7. 9,10-diiminoanthracene may be synthesised by aerial oxidation of 9,10-diaminoanthracene e.g. in benzene e.g. at 65° C. for 30 minutes. This compound is more stable than its precursor, 9,10-diaminoanthracene.

In reaction Scheme 1 the amino groups of 9,10-diaminoanthracene react as nucleophiles with the diimine groups 9,10-diiminoanthracene with displacement of ammonia. Ammonia can be smelt and detected when the fusion tube is opened.

The use of a vacuum is necessary to avoid oxidation of the monomers to anthraquinone which is liable to occur in air. Reaction in a sealed space is not sufficient because the build up of ammonia is liable either to rupture the space e.g. a sealed ampoule or to suppress the progress of the reaction.

Sealed ampoules evacuated to about $10^{-1}$ mm Hg (0.1 mm) have been found effective to allow reaction to occur. However it is preferred that continuous evacuation is used so as to ensure removal of the liberated ammonia, which will drive the reaction towards completion, as well as ensuring that the pressure of oxygen is minimised.

Vacuum of the order of $10^{-1}$ to $10^{-4}$ mm Hg may be used, preferably $10^{-1}$ to $10^{-3}$ mmHg. At vacuums greater than $10^{-4}$, e.g. $10^{-5}$ the compounds are liable to evaporate. The fused product, a dark brown, hard solid may be collected using acetone in which almost all the product dissolves. However, a very small quantity (5–10% by weight) is insoluble and may be collected by filtration. This is thought to be higher molecular weight long chain polymeric products.

The fusion method of the present invention has the advantage of simplicity and also versatility. The reaction has been observed to give oligomeric products ranging from dimer to heptamer.

Further, it has also been found that there are long chain polymeric products having molecular weights up to 8000.

The polymerisation may also be carried out starting from a solution of DAA or derivatives thereof or from solutions of the monomers (e.g. DAA and DIA or derivatives thereof) which can be mixed in the proportions needed to give the desired proportions of the molecules.

This gives homogenous mixtures. The solution can be deposited on a desired substrate and heated under vacuum. The solvents will first evaporate off and then the monomer(s) will melt and polymerise.

For devices which are to operate using voltages in the range up to 20 volts e.g. 3 to 20 volts a conductive coating will be needed on the transparent substrate. Such a coating could be an ITO layer, or a fluorine doped tin oxide layer or other appropriately conductive transparent layer.

The invention thus extends to transparent substrates provided with an electrically conducting first layer on at least one surface and on that first layer a second layer of conducting material in accordance with the present invention. The said first layer can be provided by a different electrically conducting layer e.g. of ITO. Alternatively the first and second layers can be afforded by a single layer of a material of the present invention or separate layers of a material of the present invention.

A further layer or layers can be provided on top of the said second layer. Preferably for use in electro luminescent display devices the substrate and each layer will have adequate transmission properties to pass light of the wavelength being used. For example they are preferably transparent to visible light.

The third layer is typically a layer of an electron transport or emitting material such as aluminium quinolate (see formula 15 in the accompanying drawings). Examples of other suitable materials are given in the article by Ching W. Tang in "Information Display" 10/96 at pages 16 to 19.

As alternative procedures to dissolution and filtration such as continuous extraction and chromatography may be used to separate the oligomers formed. The fusion reaction may be carried out at different times and temperatures to increase the yield of long chain polymeric products. In addition, the fusion reaction of substituted versions of 9,10-diaminoanthracene and 9,10-diiminoanthracene, may be carried out to give a range of polymeric products.

One such scheme is as set out in the Reaction Scheme 2 shown as FIG. 8 in the accompanying drawings.

In Reaction Scheme 2, $R^1$ and $R^2$ may be the same or different and may be a hydrogen atom or —$CH_3$, $CH_3CH_2$—, —$OCH_3$, —$OCH_2CH_3$, —$CH_2OCH_3$, —$CH_2OCH_2CH_2OCH_3$, methoxyethoxyethoxymethyl, aryloxymethyl, phenyl, Cl, CN or $NO_2$, —$CH_2COOR'''$ or —$CH_2NHCOR'''$ (where R''' is $C_1$–$C_6$ alkyl or a phenyl or biphenyl group), or a $C_1$–$C_5$ alkyl group, or an aryl group e.g. a benzyl group, or an —$SO_3H$ group or a hydroxyl group or a $C_1$–$C_5$ alkoxy group or an $H_2PO_3$ group, and n is an integer ranging from 2 to 100 preferably from 10 to 100, preferably 50 to 80, e.g. about 70.

The present invention also extends to a transparent electroconductive coating or a static shielding material comprising a product made by the method of the present invention.

The invention enables the production, by a simpler and cleaner route of polymeric products having the general formula (I) as discussed above.

Polymers with lower values of n, e.g. 2 to 10, or 2–15 which may be referred to as oligomers, will have higher solubility but may have lower heat stability than the polymers.

The products of the invention can be expected on partial reduction to produce materials which are conductive and therefore may find uses in thin film technology, as EMI, RFI (electro magnetic interference, radio frequency interference) shielding materials and in display systems, such as electroluminescent and liquid crystal display systems as a transparent electrode.

The oligomers or polymers disclosed herein can be used even without reduction in antistatic applications.

Such reduced polymeric products may be used with other polymers (or binders). The polymeric product—binder blend may comprise from 5 to 70% by weight of the polymeric product and from 95 to 30% by weight of the other polymer. The polymer with which the polymeric product is blended may be, for example, poly(vinyl chloride), polyethylene, polypropylene, polystyrene, nylon, poly(acrylonitrile-butadiene-styrene), poly(ethylene terephthalate), poly(ethylene oxide), polymethyl methacrylate, polyether sulphone, polyether ketone, polytetrafluoroethylene.

These blends may have sufficient conductivities to give good antistatic properties at the lower concentrations of polymeric product. At the higher concentrations the blends may possess levels of conductivity which may be useful for shielding.

Furthermore, the polymeric product imparts the required electrical property to the blend immediately and unlike alkylammonium salts, do not need moisture to impart conductivity to the polymer.

Conductive adhesives may be formulated using the polymeric product of the present invention.

The polymeric product of the present invention may also be directly deposited chemically or electrochemically onto and/or impregnated into a porous polymer film such as poly(vinyl chloride), poly(carbonate) or poly(propylene). The surface of a component so formed can be permanently conductive and may have good antistatic properties.

This surface may be painted with coloured dyes or pigments and the colour modified without impairing the antistatic properties. This method may enable antistatic floors and mats to be fabricated from the composites.

Furthermore, non-conductive materials such as talc or mica may be coated with the polymeric product of the invention either chemically or electrochemically. Such coated powders may be useful as fillers for the formation of conductive polymer composites.

Furthermore, solutions of the solvent soluble polymeric product may be sprayed onto a non-conducting surface which can then become conductive on evaporation of the solvent therefrom. The resulting film can be used in display devices.

The polymeric products produced may be dissolved in organic solvents such as acetone, dimethylformamide, dimethylsulphoxide, and N-methyl pyrrolidone, and may also be processable into thin films.

It is also possible to partially reduce the produced polymeric products with a suitable reducing agent, for example sodium cyanoborohydride, sodium borohydride, sodium borohydride-boron trifluoride etherate, lithium aluminium hydride, hydrazine and dithionites. These partially reduced polymeric products may have a lighter colour and sufficient electroconductivity to be used in transparent thin film technology. It is also possible to dope these polymeric products with suitable acid dopants, for example camphorsulphonic acid, 5-sulphosalicylic acid, para-toluenesulphonic acid, trifluoromethanesulphonic acid (triflic acid), methanesulphonic acid, trifluoroacetic acid, hydrochloric acid and sulphuric acid. This may enhance the electroconductivity of the polymeric product.

The present invention may be put into practice in various ways and a number of specific embodiments will be described to illustrate the invention with reference to the accompanying examples, which show the polycondensation method, of the present invention and to the accompanying drawings in which:

FIG. 10 is Structure II referred to herein,

Figure 19:
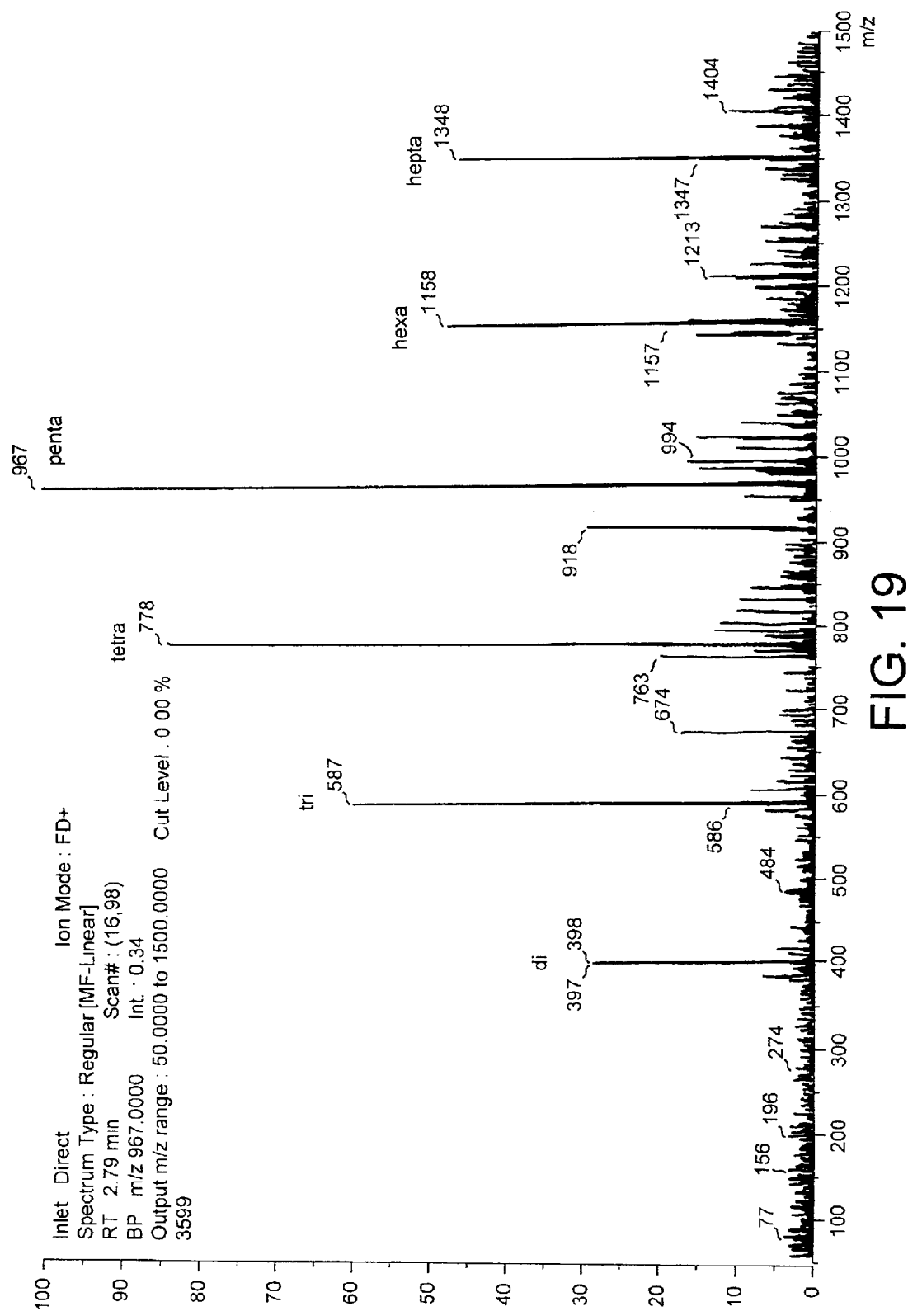
Figure 20:
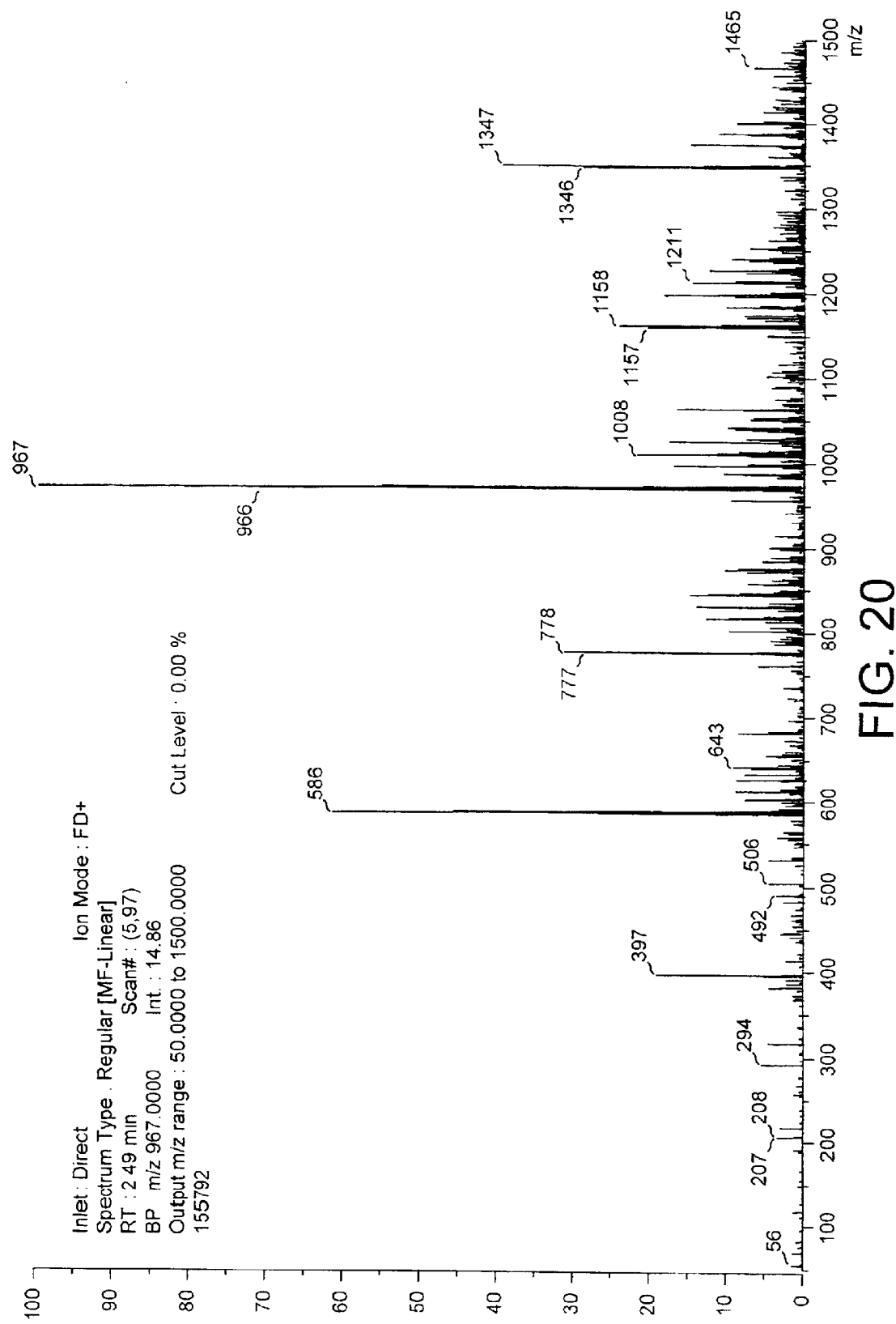
Figure 21:
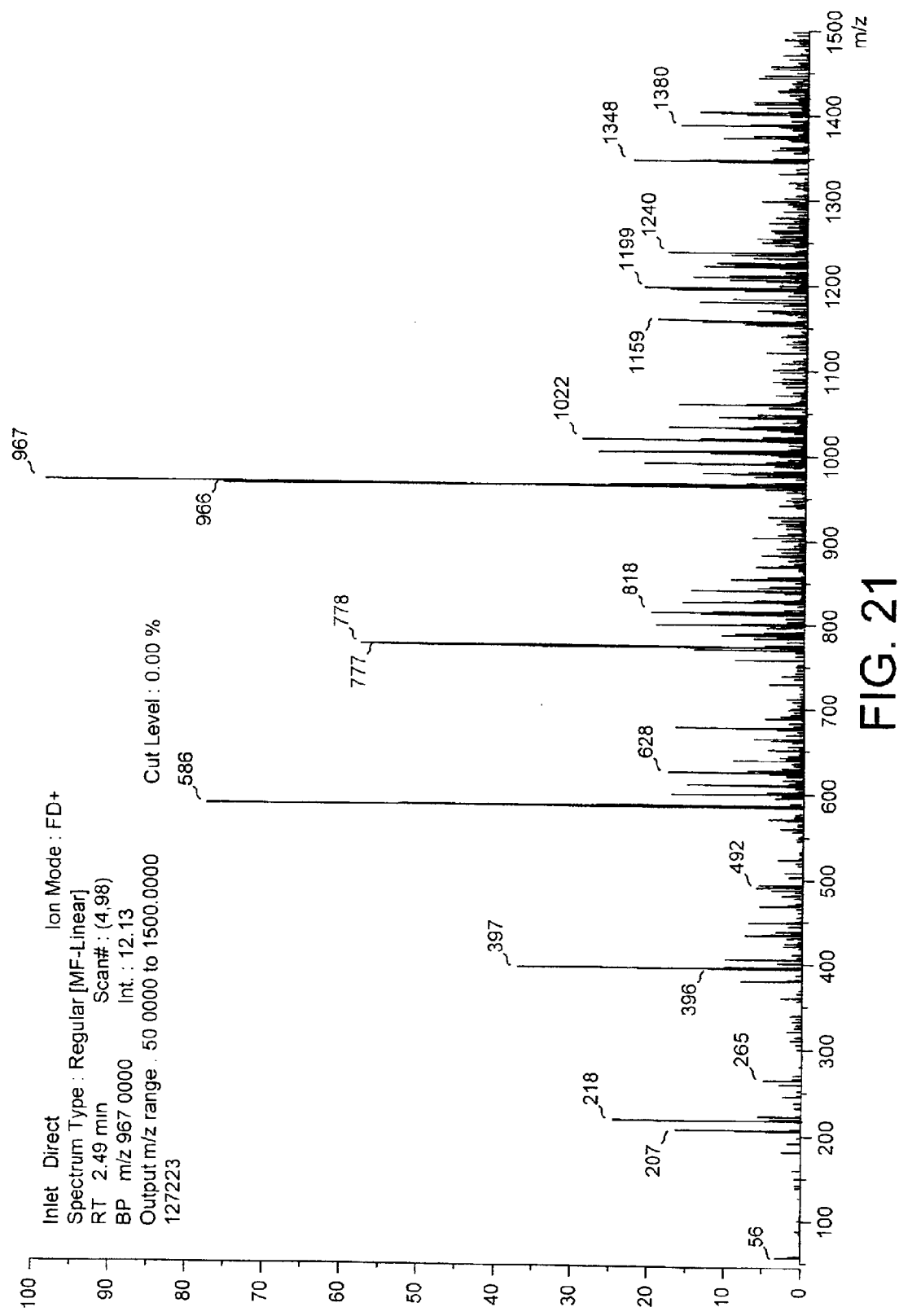
Figure 22:
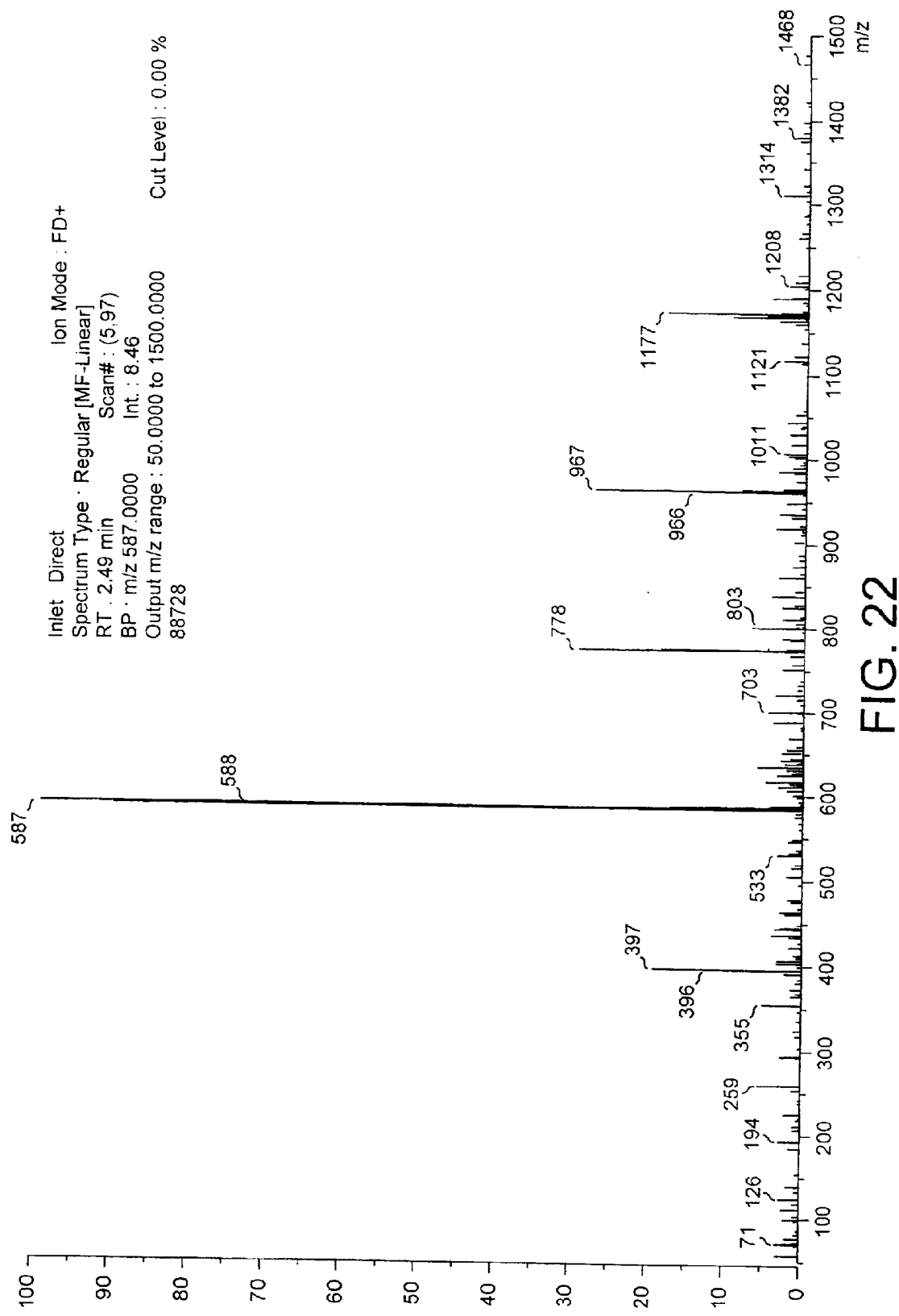
Figure 23:
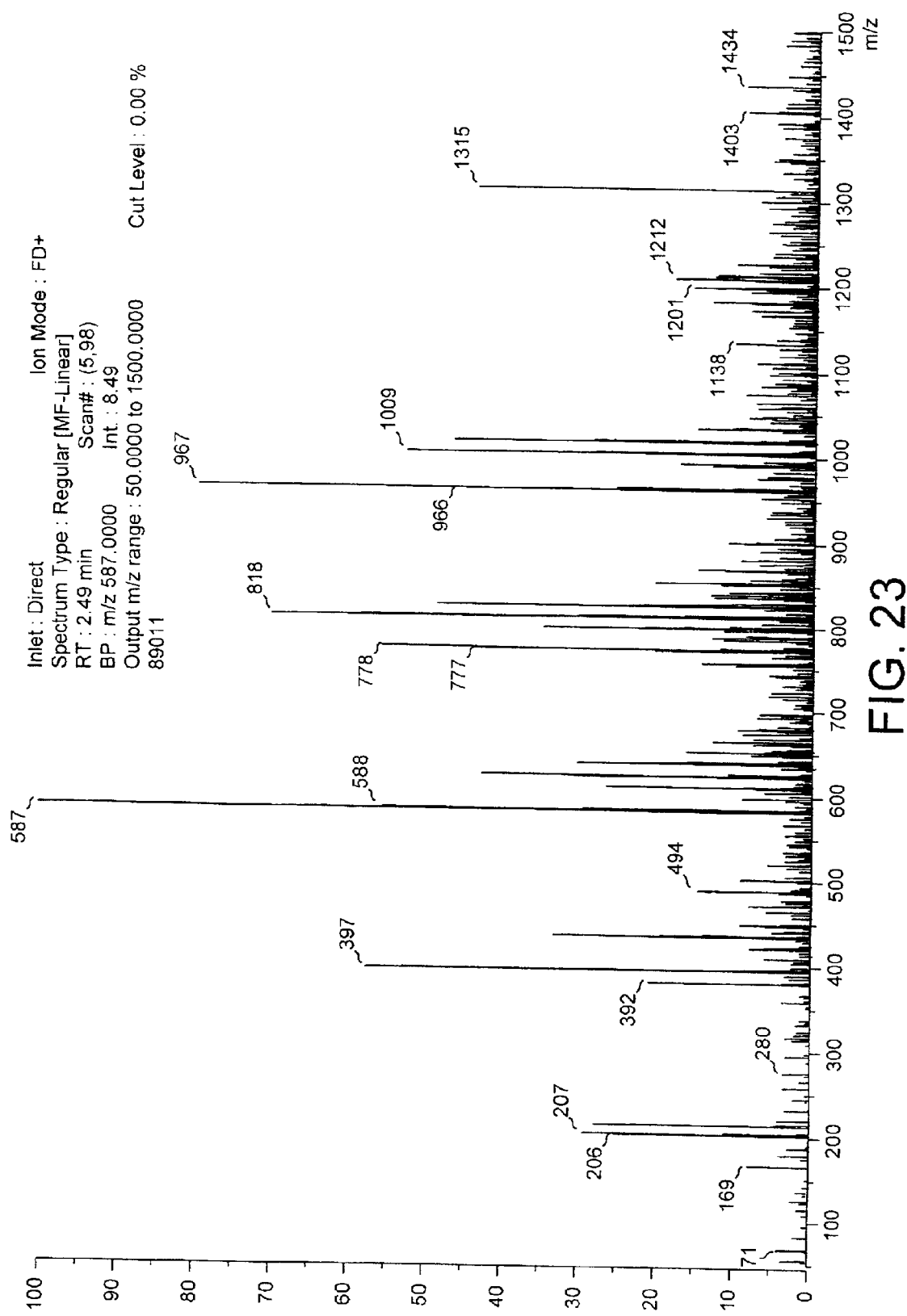
Figure 24:
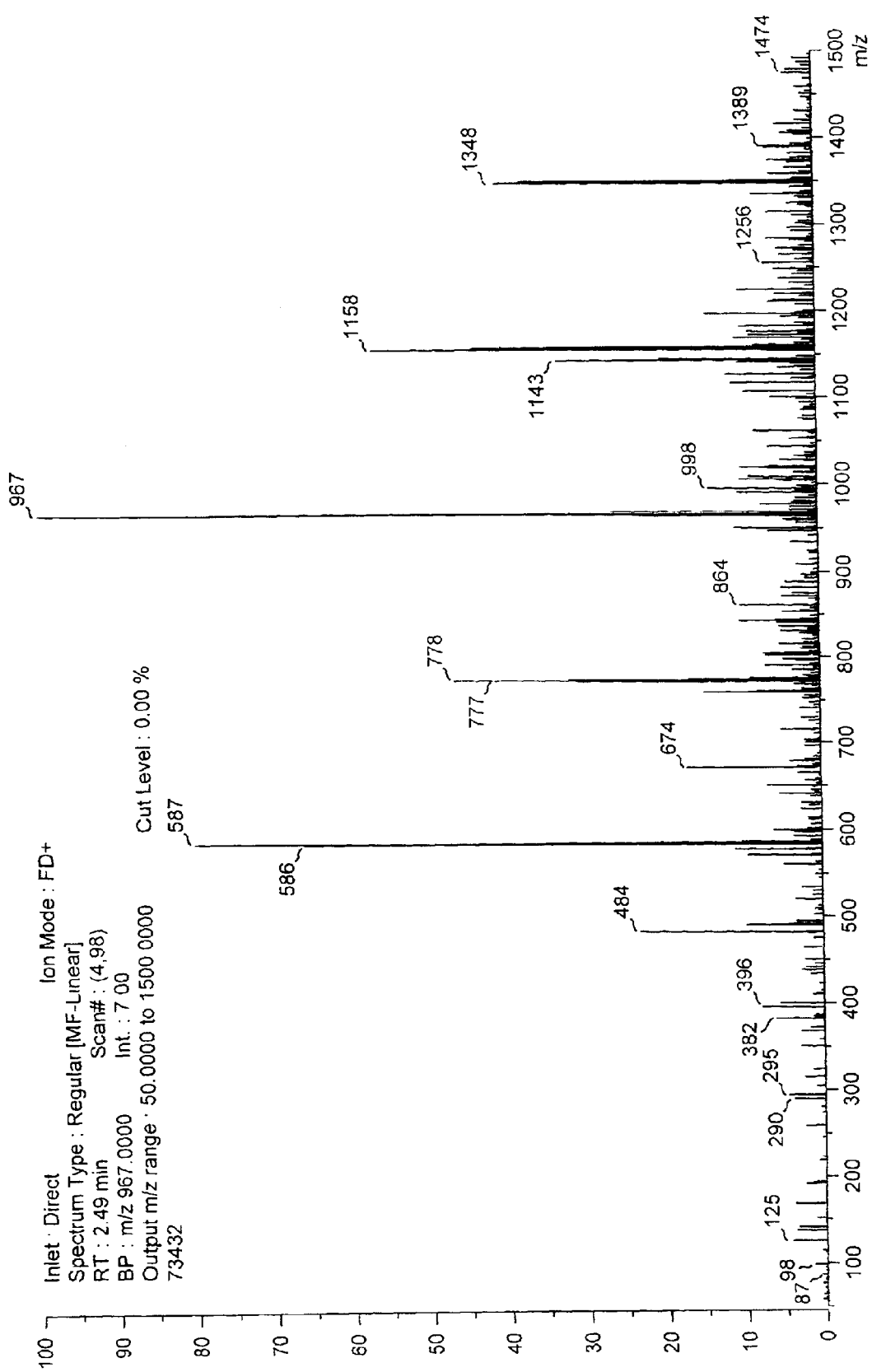
Figure 25:
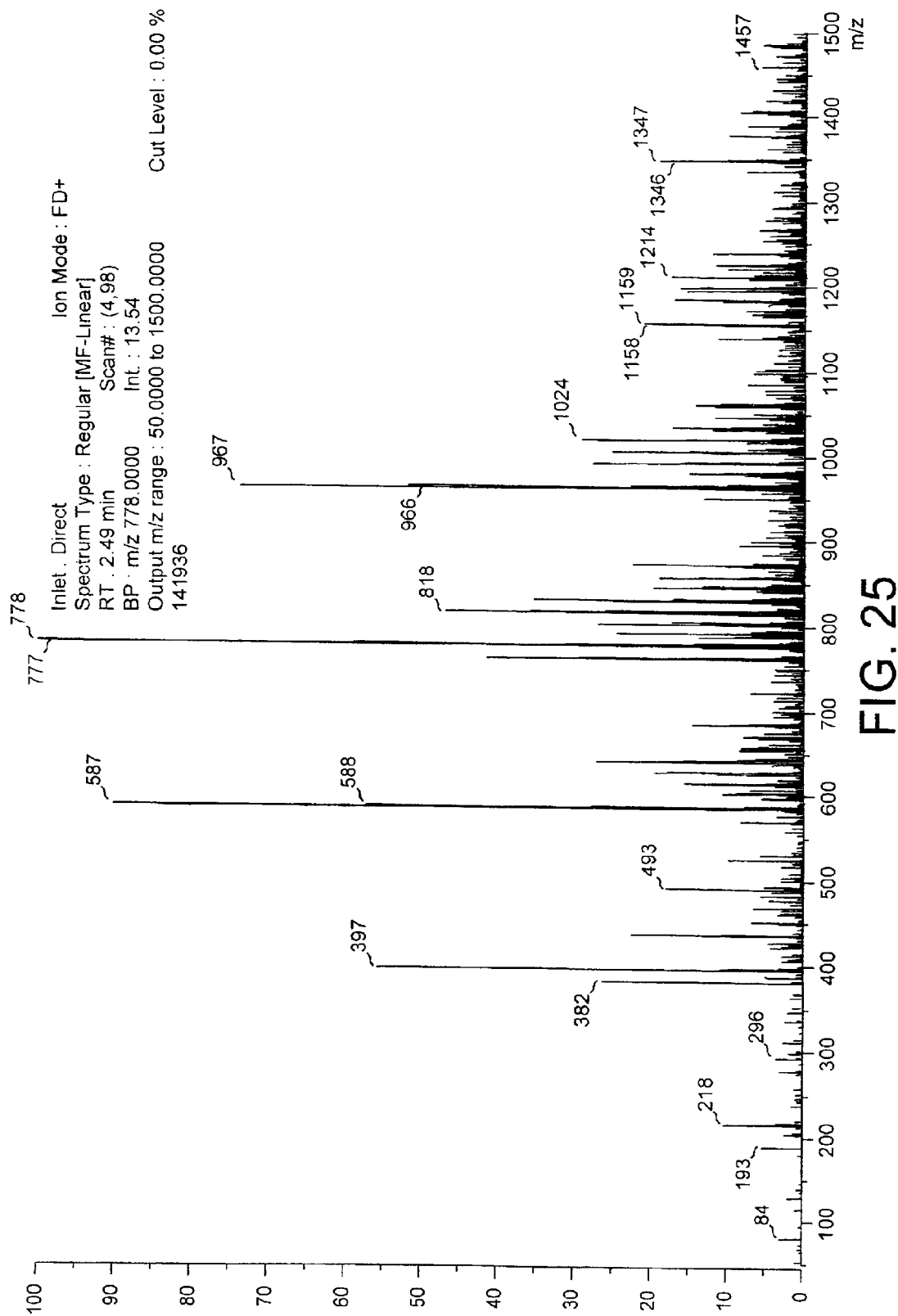
Figure 26:
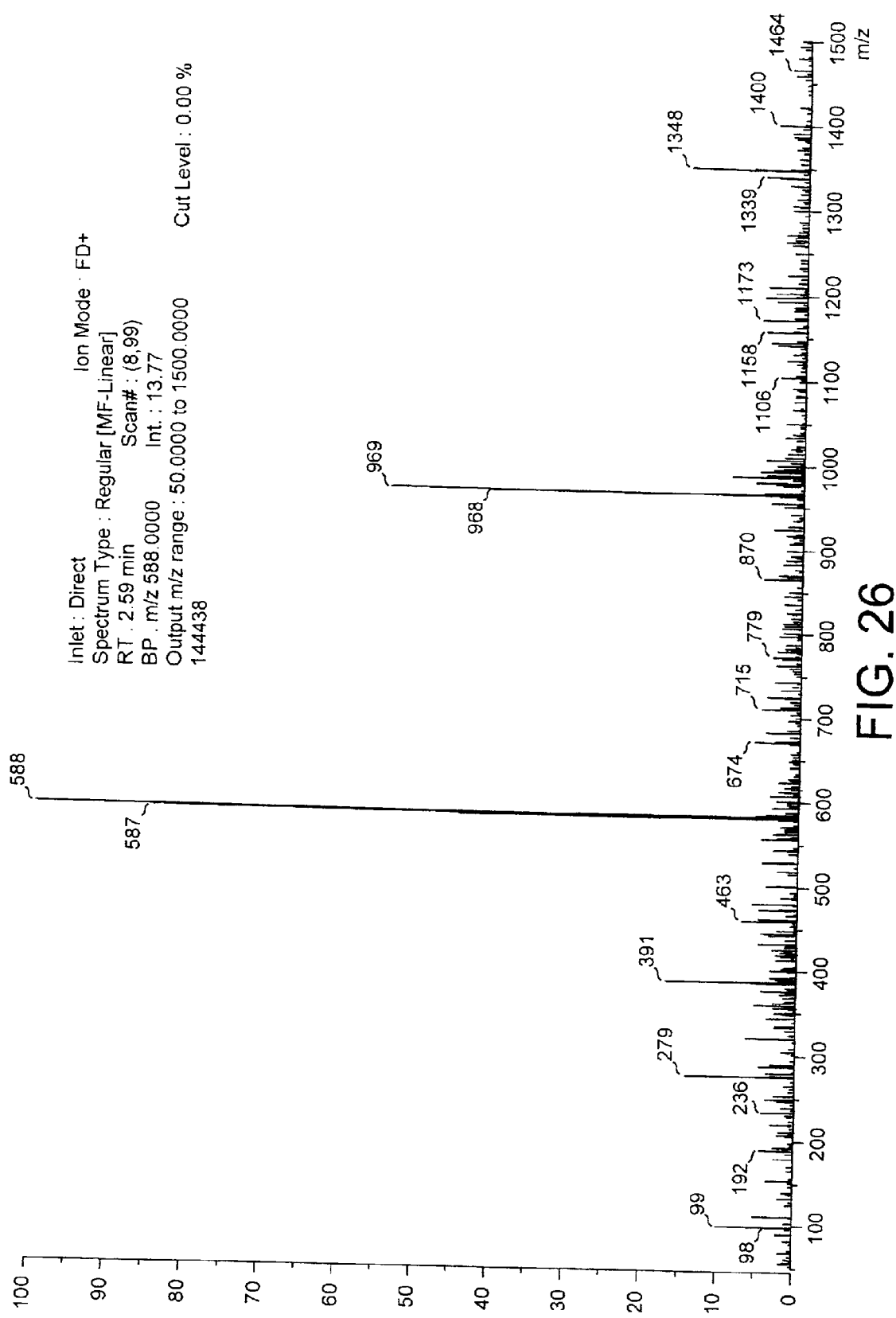
Figure 27:
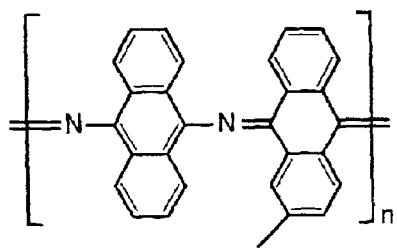
Figure 28:
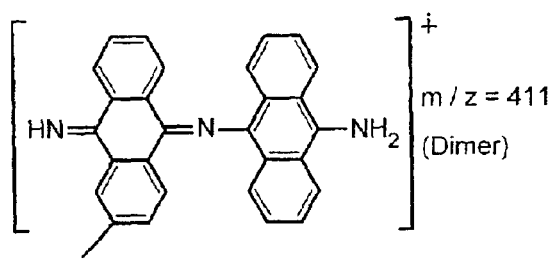
Figure 30:
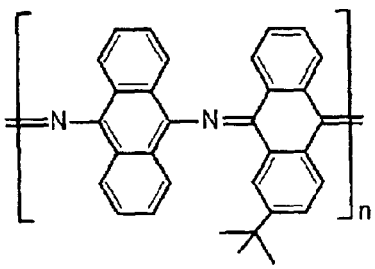
Figure 31:
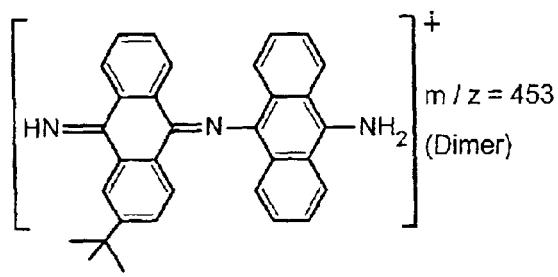
Figure 29A:
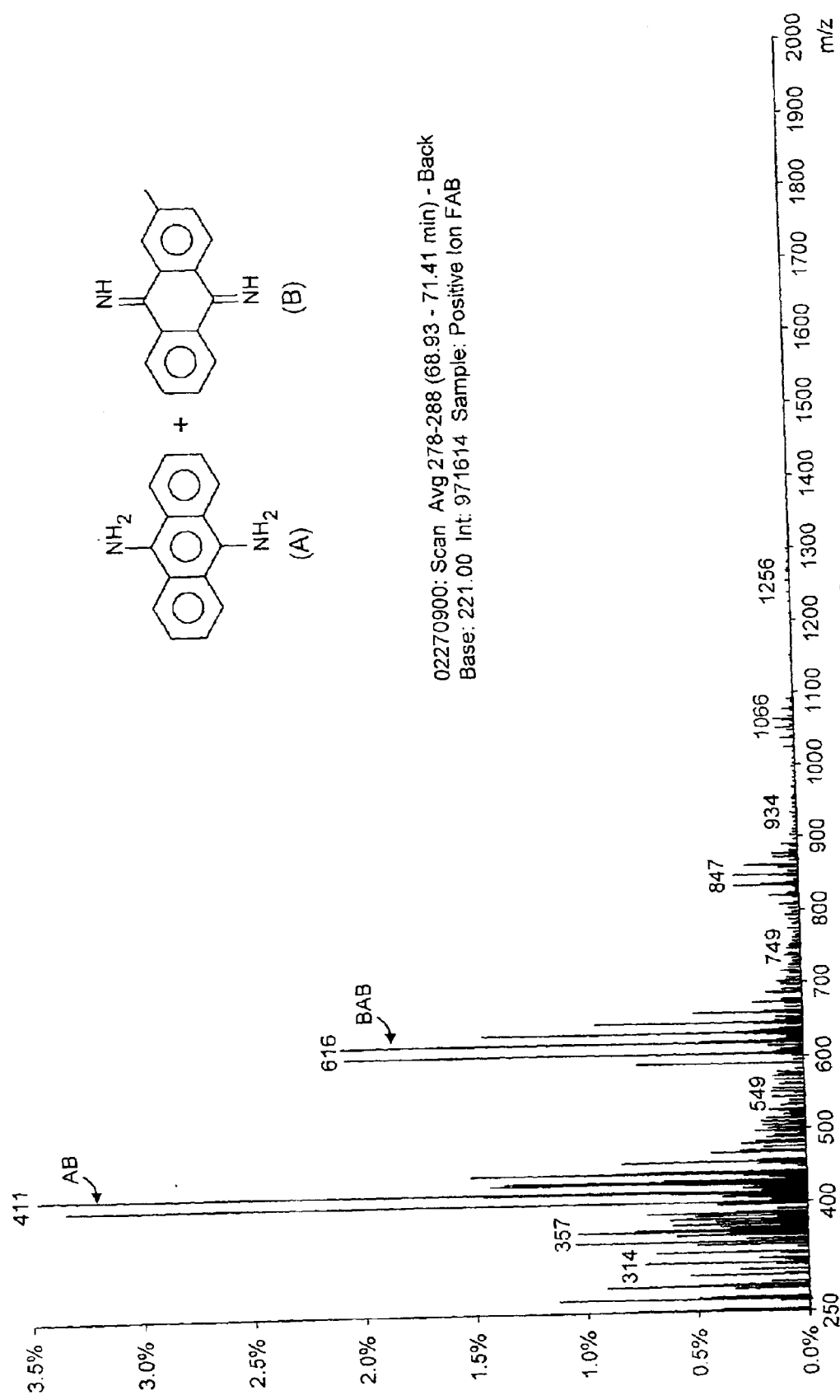
Figure 29B:
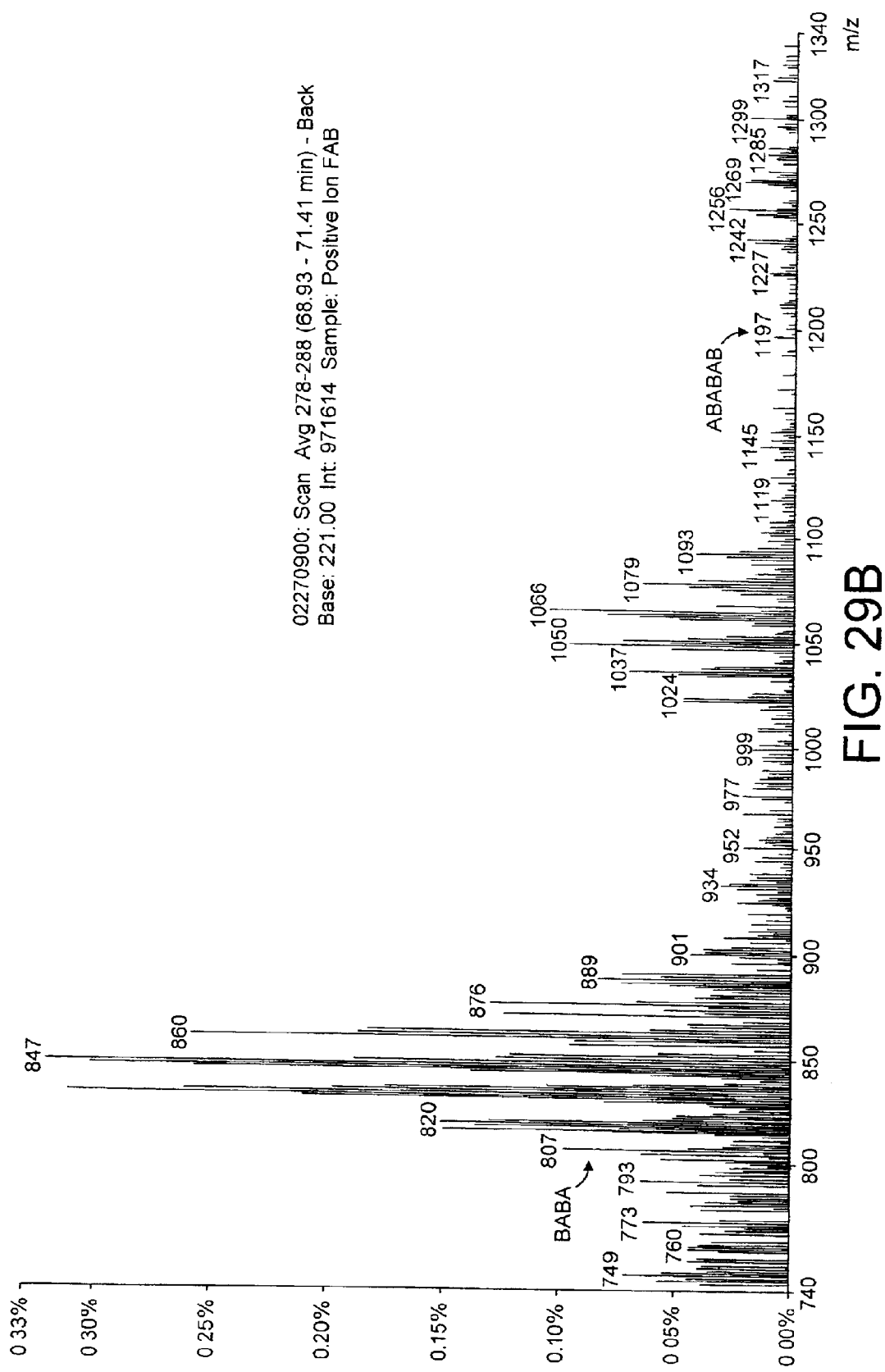
Figure 32A:
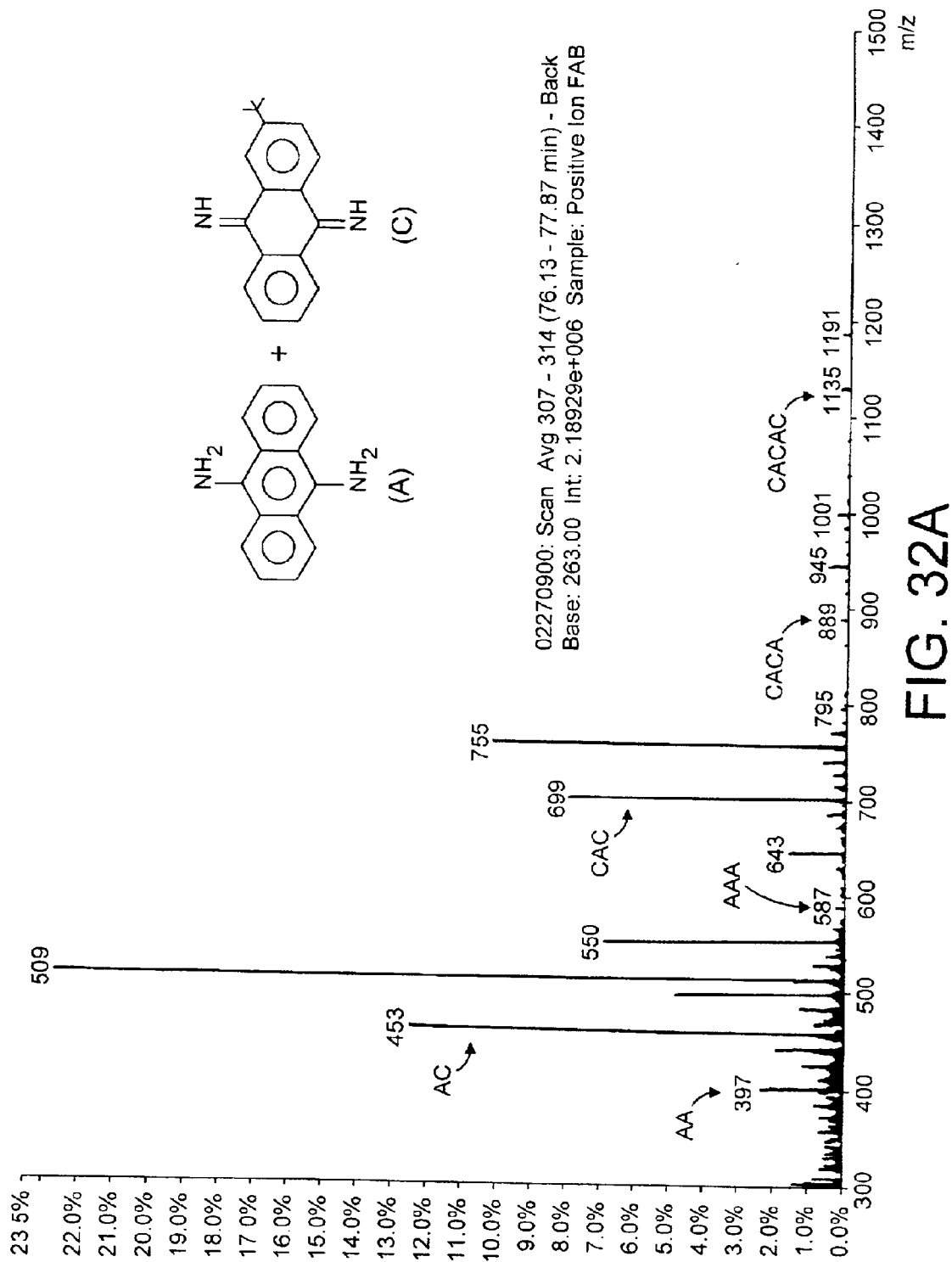
Figure 32B:
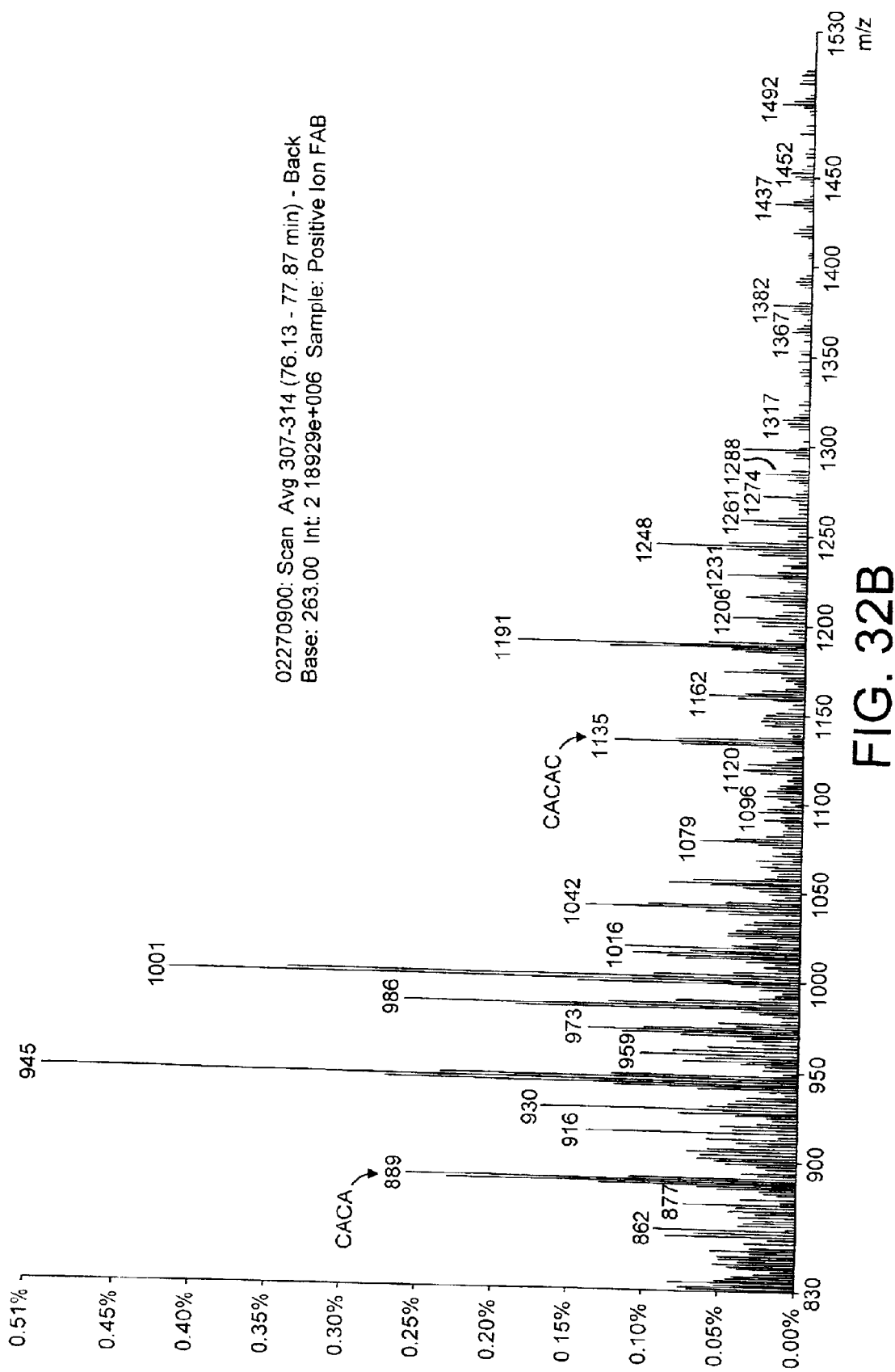

FIG. 19 is a spectra of the field disorption mass spectroscopic analysis of the acetone insoluble portion of the reaction mixture of Example 5B, FIG. 20 is a spectra of the field disorption mass spectroscopic analysis of the product G8 of Example 6, FIG. 21 is a spectra of the field disorption mass spectroscopic analysis of the product G9 of Example 6, FIG. 22 is a spectra of the field disorption mass spectroscopic analysis of the product G10 of Example 7, FIG. 23 is a spectra of the field disorption mass spectroscopic analysis of the product G11 of Example 7, FIG. 24 is a spectra of the field disorption mass spectroscopic analysis of the product G12 of Example 8, FIG. 25 is a spectra of the field disorption mass spectroscopic analysis of the product G13 of Example 8, FIG. 26 is a spectra of the field disorption mass spectroscopic analysis of the product G1 of Example 9, FIG. 27 is the expected structure of the product MS1 of Example 11, FIG. 28 is the dimer structure for Example 11, FIG. 29A is a spectra of the field disorption mass spectroscopic analysis of the product MSI of Example 11 on an enlarged scale, FIG. 29B is a spectra of the field disorption mass spectroscopic analysis of the product MS1 of Example 11 on an even more enlarged scale, FIG. 30 is the expected structure of the product MS2 of Example 12, FIG. 31 is the dimer structure for Example 12, FIG. 32A is a spectra of the field disorption mass spectroscopic analysis of the product MS2 of Example 12 on an enlarged scale, and FIG. 32B is a spectra of the field disorption mass spectroscopic analysis of the product MS2 of Example 12 on an even more enlarged scale.

The conductivity of the polymeric products was measured by the four-probe method on a standard disc of the sample co-polymer. This method is as follows. The powdered polymeric product is compressed into a thin pellet of uniform thickness. A linear spring loaded four probe conductivity cell was used to determine the conductivity. The outer two electrodes are used to measure the current (I), the voltage (V) being measured across the inner two. The volume conductivity is then calculated according to the following equation:

$$\text{resistivity} = \frac{1}{\text{conductivity}} = 4.532 \underline{V} \times \text{thickness of pellet} \quad \text{I}$$

The four probe method is appropriate for measuring conductivities of the order of $10^{-6}$ S cm$^{-1}$ or higher i.e. $10^{-5}$ S cm$^{-1}$ and above but requires excessive voltages to be used for measuring lower conductivities in order to produce current values which can be accurately measured.

For such lower conductivities we use the standard two probe method. Here a cylindrical disc of the sample to be tested is made by compression of a powder of the material. The disc is located between two brass cylinder electrodes with their contact faces provided with platinum foil contact surfaces. The brass cylinders are of the same diameter as the sample disc. The disc and cylinders are enclosed in a screw threaded container which enables them to be urged into tight contact. A known current is passed through the array from face to face of the sample disc and the voltage drop is measured. The conductivity (σ) (sigma) can then be calculated from the equations:

$$R = V/I; \quad R = \rho \times \frac{\text{length of disc}}{\text{cross section area of disc}}$$
$$\sigma = 1/\rho \ S \ cm^{-1}$$

The two probe method involves higher contact resistance than the four probe method and accordingly the four probe method is preferable.

All mass spectra results given herein were carried out using the fast atomic bombardment method (FAB) using a VG ZAB 2SE machine running FAB with a Xenon saddle field fast atom gun. The matrix was MNOBA.

The m/e values given below in the examples relate to the fragments which can be produced by break up of the polymer molecules including single, double, triple and longer repeat units. Each of the mass spectra given indicate that polymeric species were present.

Such mass spectra may have the scale of the intensity expanded so as to reveal the more rare fragments. The mass spectra may be rebased i.e in some cases the most frequently occurring fragment is taken as having 100% intensity ie as the base peak; in other cases a less frequently occurring fragment e.g. a smaller one may be taken to have 100% intensity and the other peaks are recalculated on the new base peak.

Mass spectra analysis by fast atomic bombardment is a standard procedure. The sample to be tested is dissolved in a solvent and injected into a tube. This dispersed sample is bombarded with ionised xenon producing fragments of the molecules present in the dispersed sample which fragments are ionized, a spectrum of ions of different mass thus being produced. The number outside the brackets, e.g. 209 in 209 (100) above, is the mass of the fragment. The numbers of each fragment of the same mass is summed and the total of the figure inside the brackets i.e. 100 in 209 (100) is called the intensity. An intensity of (100) is the frequency of occurrence of the most stable ionized fragment which may be the monomeric species, the so called "base peak".

The mass of DAA is 208, so that in this case the "base peak" is close to the monomeric species. Low intensity values e.g. (0.2), indicate the largest species detected and since masses greater than about 2000–2500 are not readily detected by this form of mass spectral analysis, low intensity values indicate that even larger species can be expected to exist.

EXAMPLE 1

Preparation of Diaminoanthracene

This can be prepared by the procedure of Schiedt (J. fur Praktische Chemie N.F. Band 157, 1941, p. 203–224 at 218) as follows:

20 g of anthraquinone was heated at boiling point with 200 ml formamide for 4 hours. The supernatent anthraquinone slowly disappeared while yellow crystals deposited. The solution was cooled, suction filtered and washed thoroughly with alcohol. The resultant 9,10-diformylaminoanthracene was recrystalized from formamide giving long yellow crystals mpt 439° C. Chemical analysis for $C_{16} H_{12} O_2 N_2$ was calculated N 10.60%, found N10.88%. 40 g of KOH was dissolved in 100 ml of methanol and 10 g of the 9,10 diformylaminoanthracene prepared above was added and formed a deep red brown solution. This was heated at boiling point for one hour, when red glistening crystals separated. The solution was cooled, suction filtered with the exclusion of air and the crystals washed with methanol. The crystal mass was dissolved in acetone, filtered as necessary and the filtrate carefully mixed with petroleum ether to deposit 9,10 diaminoanthracene as glistening flakes. Recrystalization from acetone gave deep red crystals. Chemical analysis for $C_{14} H_{12} N_2$ was calculated C 80.75%, H 5.81%, N 13.44% found C 81.06%, H 5.18%, N 12.47%.

EXAMPLE 2

Fusion Polymerisation of 9,10-diaminoanthracene 9,10-diaminoanthracene (1.0 g; 4.8 mmol) was sealed in an evacuated glass ampoule having an internal volume of 38 ml. The ampoule is evacuated by an oil vacuum pump which is specified to evacuate to a pressure of $10^{-1}$ mmHg. The sealed ampoule was placed in an oven at a temperature of 160° C. which is just above the melting point of the DAA which then melted within one minute. The ampoule was heated for 12 hours. The ampoule was then allowed to cool and the ampoule broken open and the solid contents dissolved in acetone (40 ml) and the solvent then evaporated off to leave a solid residue (F2.1). This residue was then washed with petroleum ether (30 ml). The solid residue F2.2 was then characterised as follows.

Figure 4:
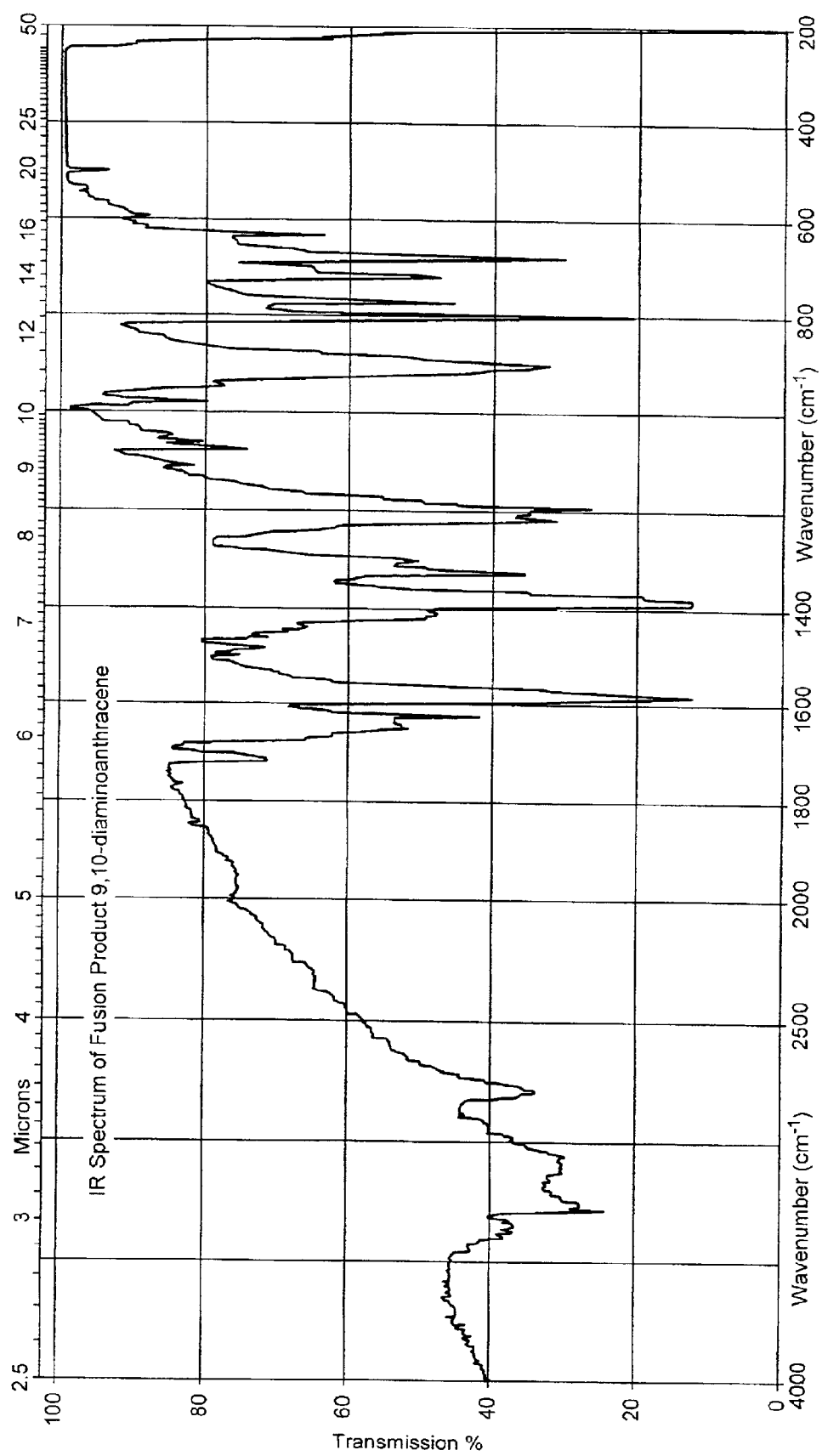
FIG. 4 is an IR spectra of the product F2.2 of Example 2.

IR (KBr disc), $\gamma_{max}$: 3290, 2790, 1700, (C=O), 1640 (C=N), 1610, 1575 and 1380 cm$^{-1}$ (see FIG. 4)

Figure 5:
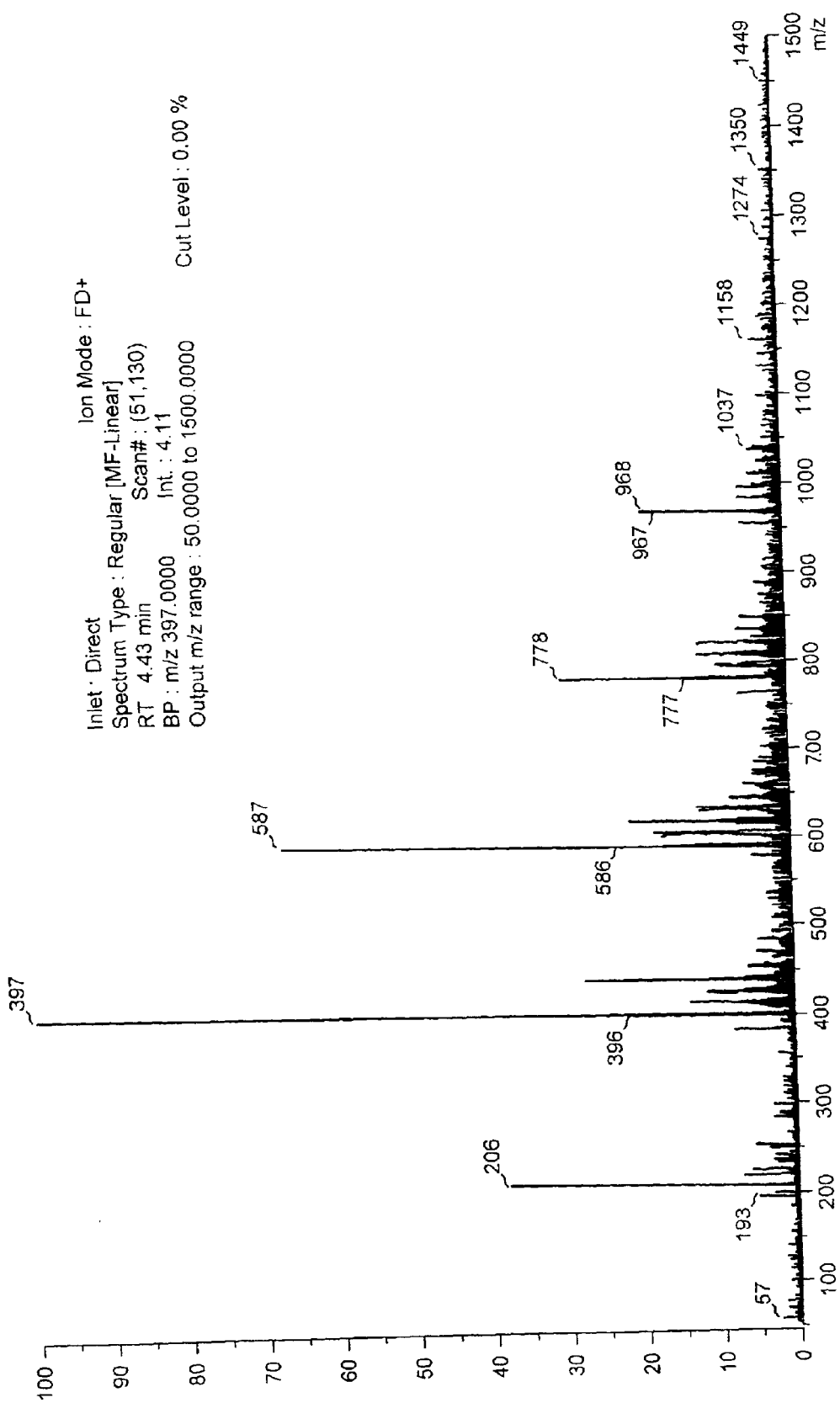
FIG. 5 is a spectra of the field disorption mass spectroscopic analysis of the product F2.2 of Example 2.

Mass (m/z) (%): 397 (100), 587 (65), 778 (30), 968(20) (See FIG. 5)

UV-vis $\lambda_{max}$ (0.03 mg ml$^{-1}$ in acetone): 384, 399 and 442 nm

Elemental Analysis: Found, C, 78.00; H, 5.12; N, 11.06%. $C_{28}H_{21}N_3$ (dimer) requires, C, 84.21; H. 5.26; N, 10.52%.

Figure 9:
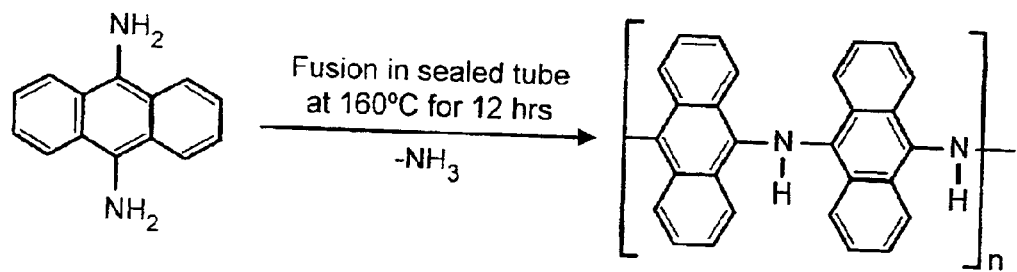
FIG. 9 is reaction Scheme 3 referred to herein.
Figure 10:
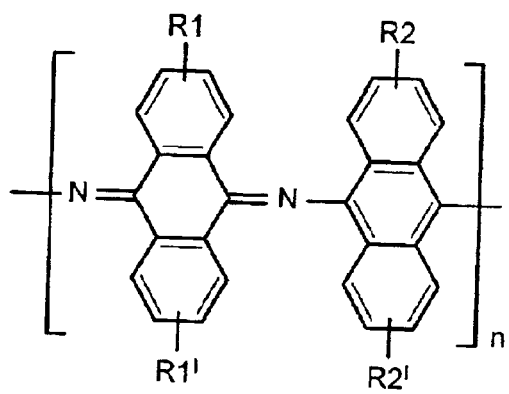
FIG. 10 is Structure I referred to herein.

This example involved Reaction Scheme 3 which is shown as FIG. 9 in the accompanying drawings.

Figure 6:
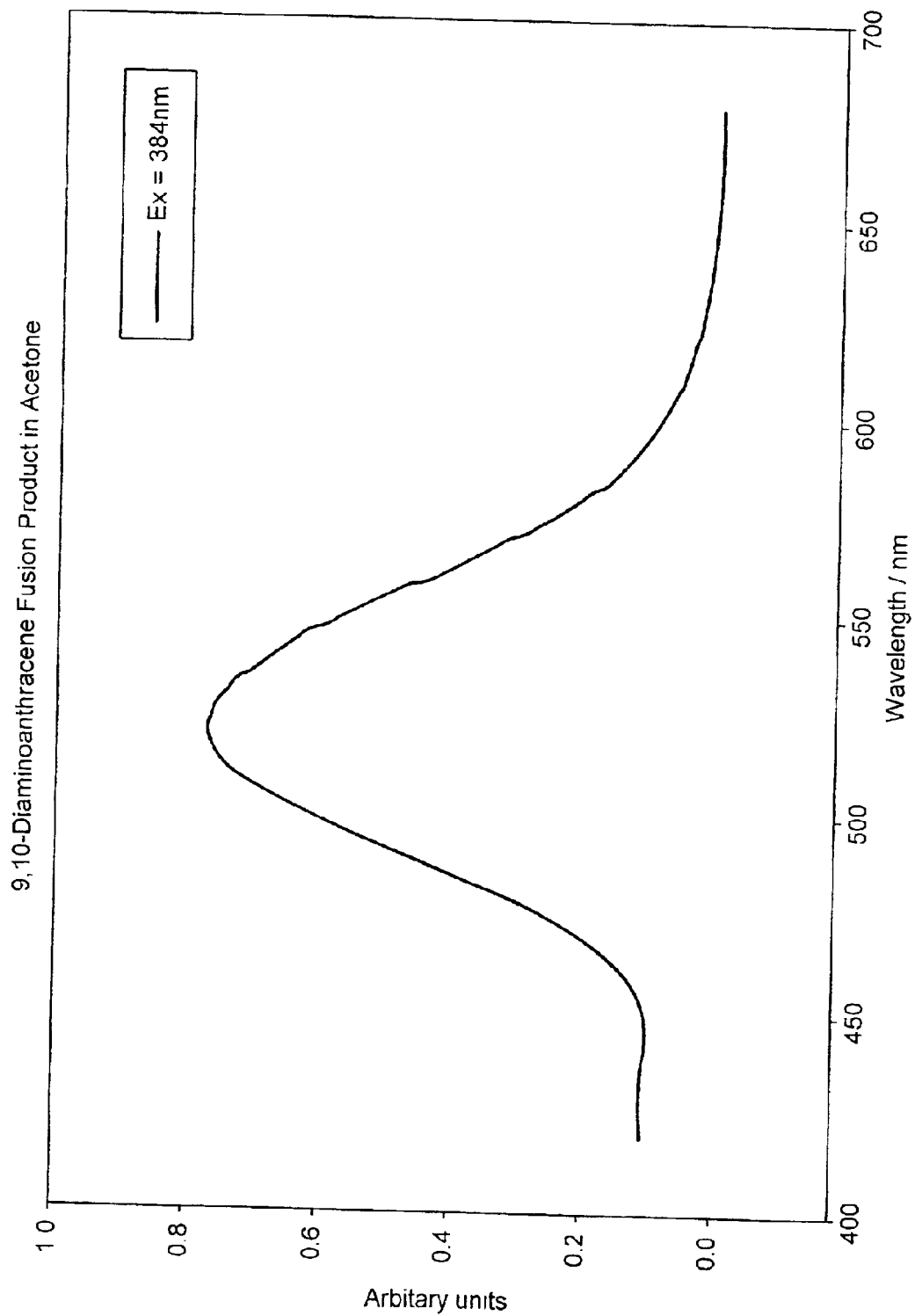
FIG. 6 is a photo luminescence spectra for the product F2.2 of Example 2.
Figure 7:
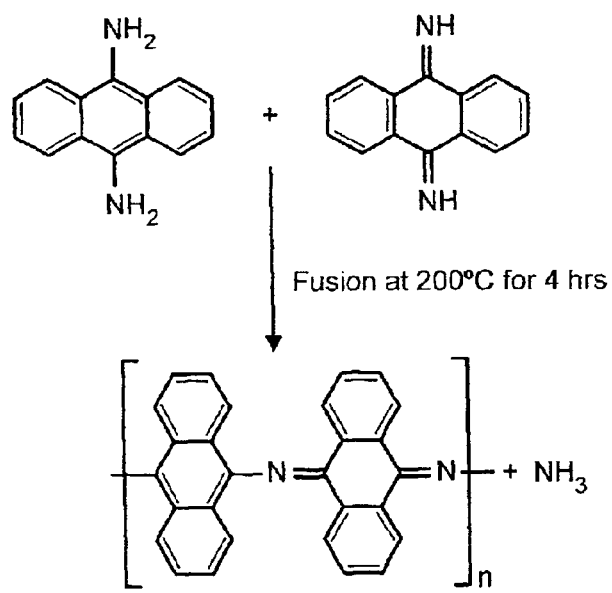
FIG. 7 is reaction Scheme 1 referred to herein.
Figure 8:
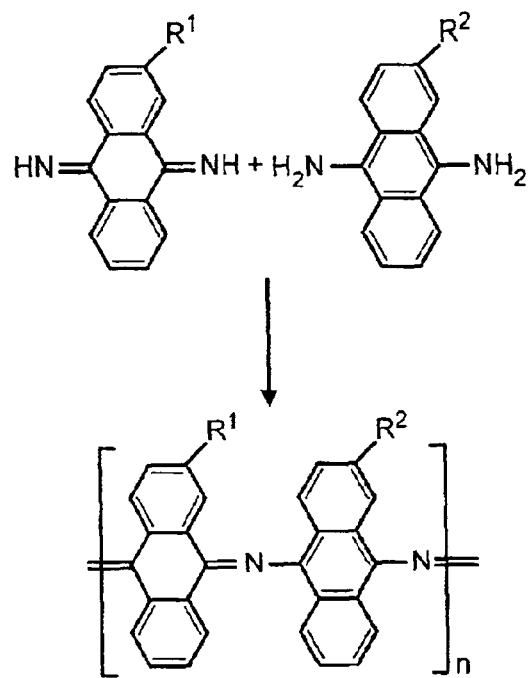
FIG. 8 is reaction Scheme 2 referred to herein.
Figure 11:
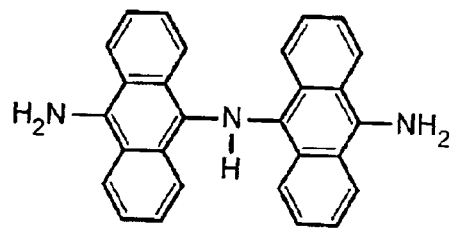

The presence of a C=N absorption peak of the solid in the range of 1640–1610 cm$^{-1}$ was indicated in the IR (KBr) spectrum (FIG. 4). In the elemental analysis, the nitrogen percentage was 10.52 suggesting the presence of dimer (Structure IV) in the product. The field disorption mass spectrum (FD) showed a main fragment ion peak at 397 (dimer, 100%). In addition, there were peaks observed at 587 (trimer, 65%), 778 (tetramer, 30%) and 968 (pentamer, 20%) (FIG. 5). This result suggested that the 9,10-diaminoanthracene could react with itself on fusion with liberation of ammonia to form structure II shown as FIG. 11 in the accompanying drawings. An acetone solution of the solid obtained showed photoluminescence (P)L with a peak at 525 nm ($\lambda_{ex}$=384 nm) (FIG. 6).

EXAMPLE 3
Polymerisation of Unsubstituted DAA with Unsubstituted DIA by Fusion Reaction 9,10-diaminoanthracene (4.0 g; 19.2 mol) was thoroughly mixed with 9,10-diiminoanthracene (3.9 g; 19.2 mmol). The intimate mixture was sealed in an evacuated glass ampoule having an internal volume of about 30 cm$^3$. The sealed ampoule was placed in an oven at a temperature of 200° C. which is just above the melting point of the mixture of 50/50% DAA/DIA on a molar basis which then melted within one minute and the ampoule was held in the oven for 4 hours at 200° C. The ampoule was then allowed to cool and the ampoule broken open and the black brown solid contents removed from the tube by contacting with acetone (300 ml). The solution was filtered to collect the insoluble material (F3.1) (about 5%–10% by weight of the starting materials).

Figure 2:
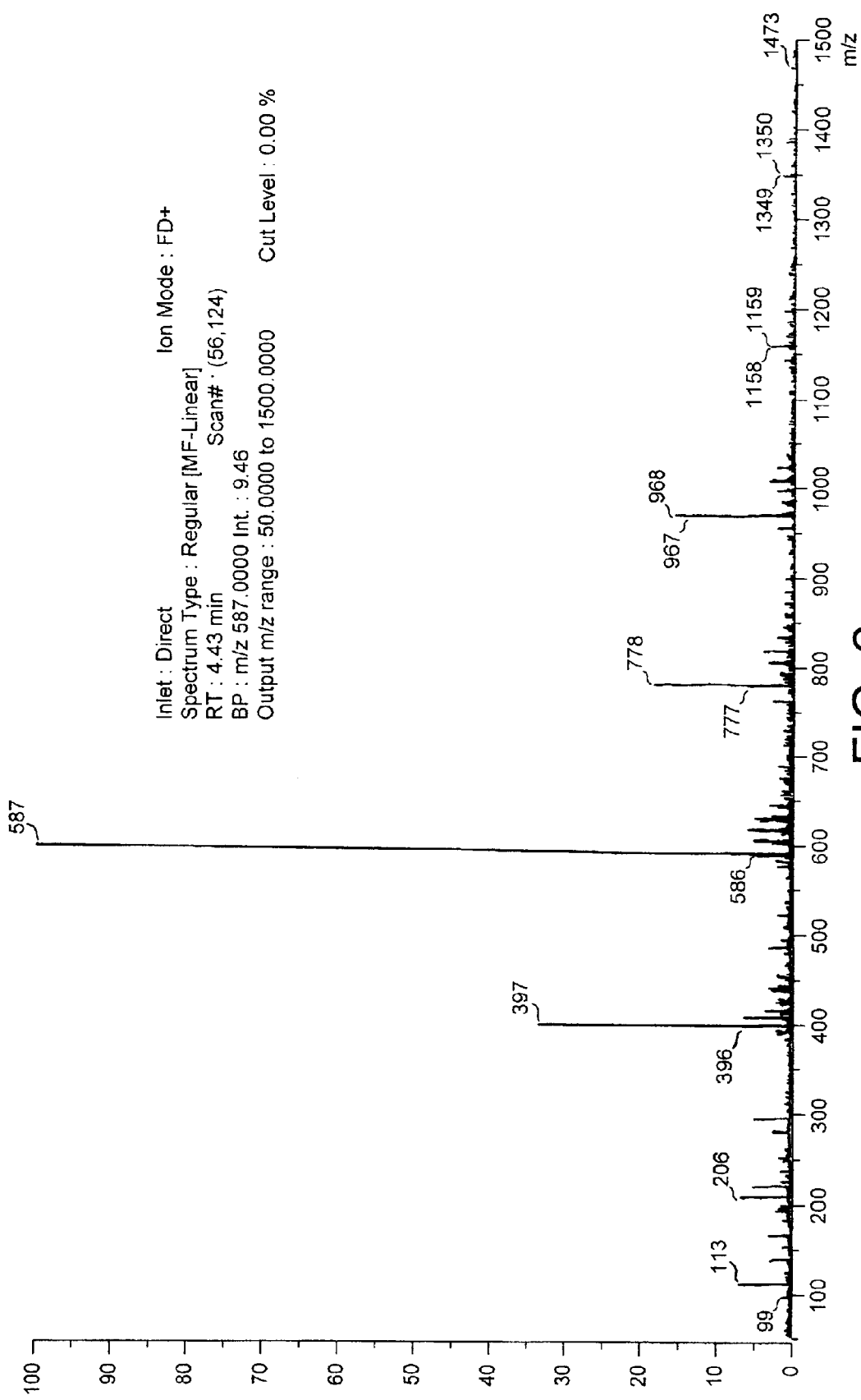
FIG. 2 is a spectra of the field disorption mass spectroscopic analysis for the product of F3.1.
Figure 3:
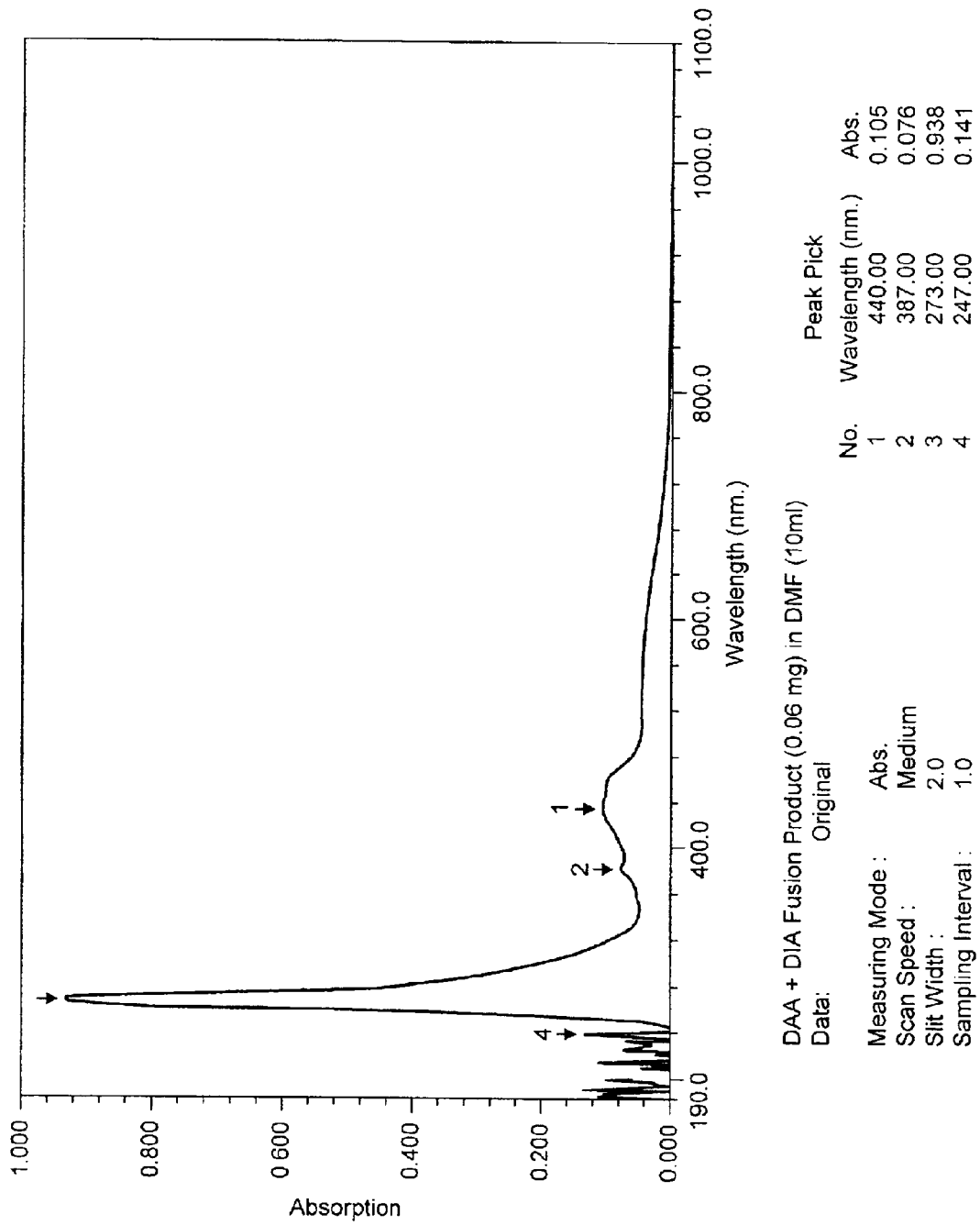
FIG. 3 is a UV visible spectra for the product of example F3.1.

The acetone-insoluble material F3.1 was characterised as follows. IR(KBr disc), $\gamma_{max}$: 2800, 3300, 1650, 1610 (C=N), 1380, 1310 cm$^{-1}$ (see FIG. 1) UV-vis $\lambda_{max}$(0.01 mg ml$^{-1}$ in DMF): 247, 273, 387 and 440 nm (see FIG. 3) Mass (m/z)(%) 397 (35, dimer), 587 (100, trimer), 778 (22, tetramer) 968 (18, pentamer), 1159 (5, hexamer), and 1350 (3, heptamer) (see FIG. 2).

Figure 1:
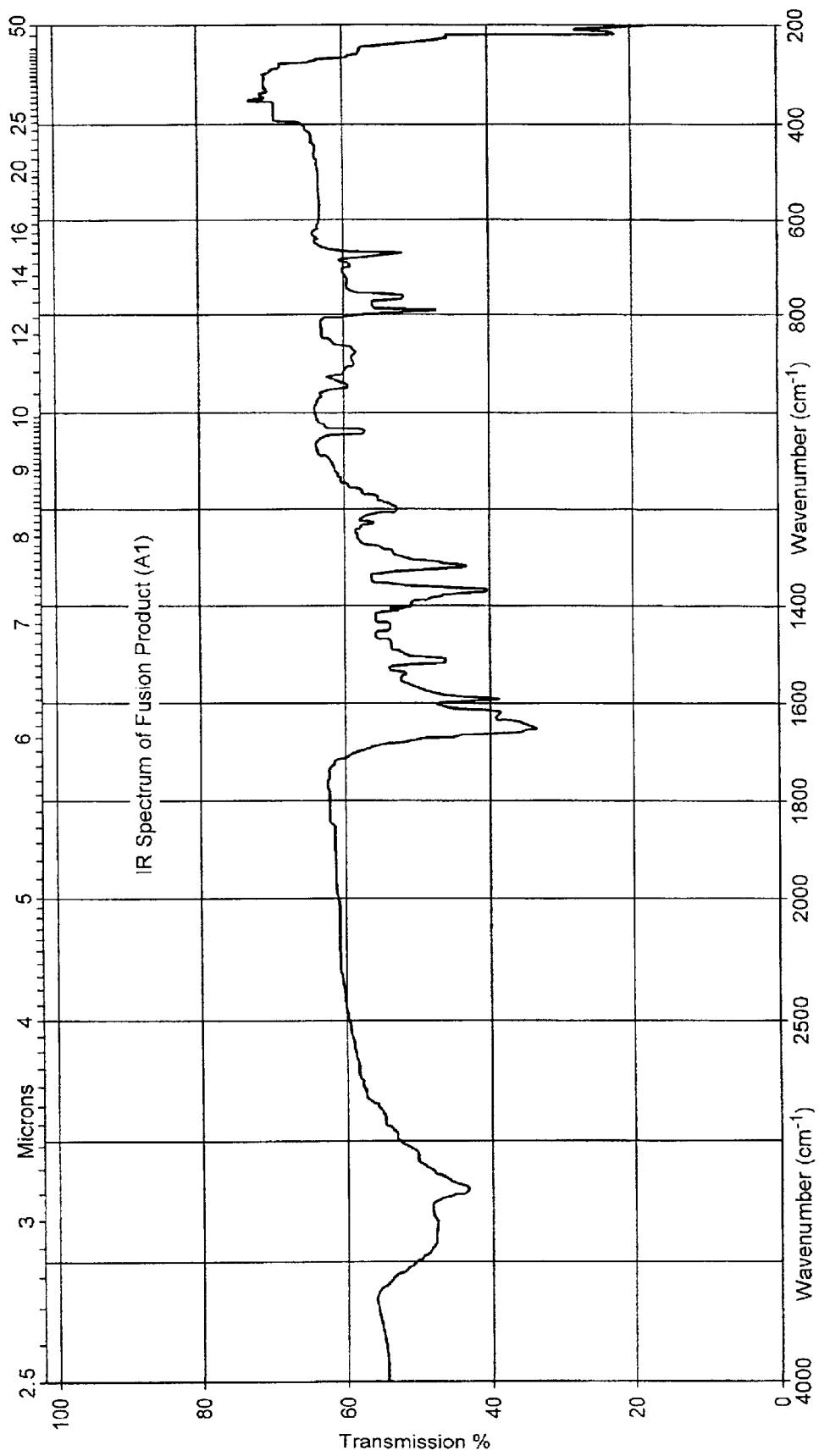
FIG. 1 is an IR spectra for the insoluble product (F3.1) of Example 3.
Figure 12:
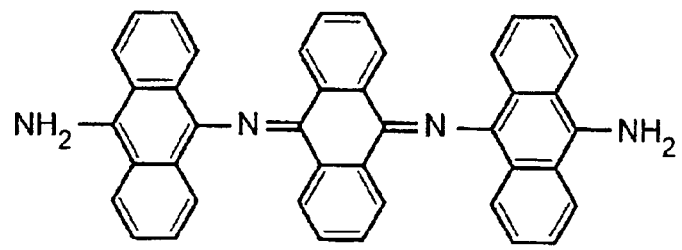
FIG. 12 is the Structure III referred to herein.

The IR spectrum of the insoluble material (F3.1) showed mixed absorption bands which were assigned to skeletal vibration of the aromatic ring and quinonoid imine group in a region from 1650 to 1580 cm$^{-1}$ (see FIG. 1). Both polyaniline and poly (1-aminoanthracene) also exhibit the same absorption band region in the IR spectrum. FD (Field Disorption) mass spectrometric analysis of the insoluble solid indeed confirmed that there were mixtures of oligomers from dimer to heptamer present (see FIG. 2). The highest peak fragment was observed at 587 (100%, trimer) (Structure III). The trimer has the structure III given as FIG. 12 in the accompanying drawings.

This solid (F3.1) was insoluble in common organic polar solvents (e.g. MeOH, CHCl$_3$, and $C_2H_5OC_2H_5$) but was completely soluble in dimethly sulfoxide (DMSO), dimethylformamide (DMF) and N-methyl-2-pyrrolidone (NMP). The UV-visible spectrum of this material (F3.1) was recorded in DMF solution (see FIG. 3). The material showed four absorption bands in the UV region with one distinct absorption band at 440 nm in the visible region. Poly(1-aminoanthracene) does not show such an absorption band in the visible region. The solution of the acetone-insoluble product (F3.1) in DMF did not show any visible photoluminescence. This does not preclude the presence of higher molecular weight species.

The molecular weight of the acetone-insoluble material (F3.1) was determined by gel permeation chromatography (GPC). It was found that 20% of the material had a molecular weight of more than 1000 and the highest molecular weights observed were up to 8000. The GPC curve gave a single peak and revealed a narrow molecular weight distribution ($M_w/M_n$=1.87). Electrical conductivity of the solid by the four probe method showed a conductivity value of $1.0\times10^{-5}$ Scm$^{-1}$.

The acetone-soluble fraction (3B.1) was isolated by removal of the solvent. It was fractionated by extraction with hot solvents ranging from n-hexane to 1,4-dioxan. The flowchart of the fractionation (residues and filtrates were labelled) is shown below with yields of fractions and the amounts of the solvents used. The solvents were removed from the filtrates to collect the soluble materials for analysis.

These solids (3B.1) were subjected to differential dissolution in liquids of progressively increasing polarity whereby the solids were dissolved and removed starting with those of lowest molecular weight (MW).

This fractionation was carried out using hot solvents (temperature range 40 to 60° C.) namely

| | | |
|---|---|---|
| cyclohexane | S3.2 | polarity 30.9 |
| n-hexane | S3.1 | polarity 31.0 |
| benzene | S3.3 | polarity 34.3 |
| diethyl ether | S3.4 | polarity 34.4 |
| dioxane | S3.5 | polarity 36 |

Polarity is referred to as ionising power ($E_t(30)$) and does not have units. It is measured at 30° C. These values are given in "Advanced Organic Chemistry" 4$^{th}$ Edition by Jerry March at pages 360–362.

This fractionation procedure is shown as flowchart 1 below.

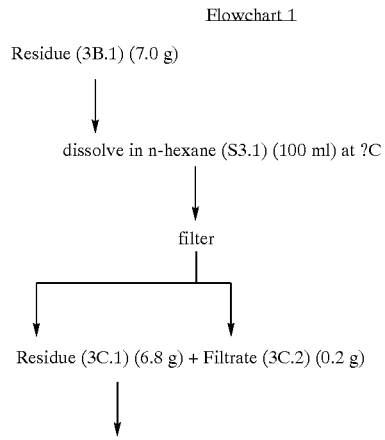

Flowchart 1

Residue (3B.1) (7.0 g)
↓
dissolve in n-hexane (S3.1) (100 ml) at ?C
↓
filter
↓
Residue (3C.1) (6.8 g) + Filtrate (3C.2) (0.2 g)
↓

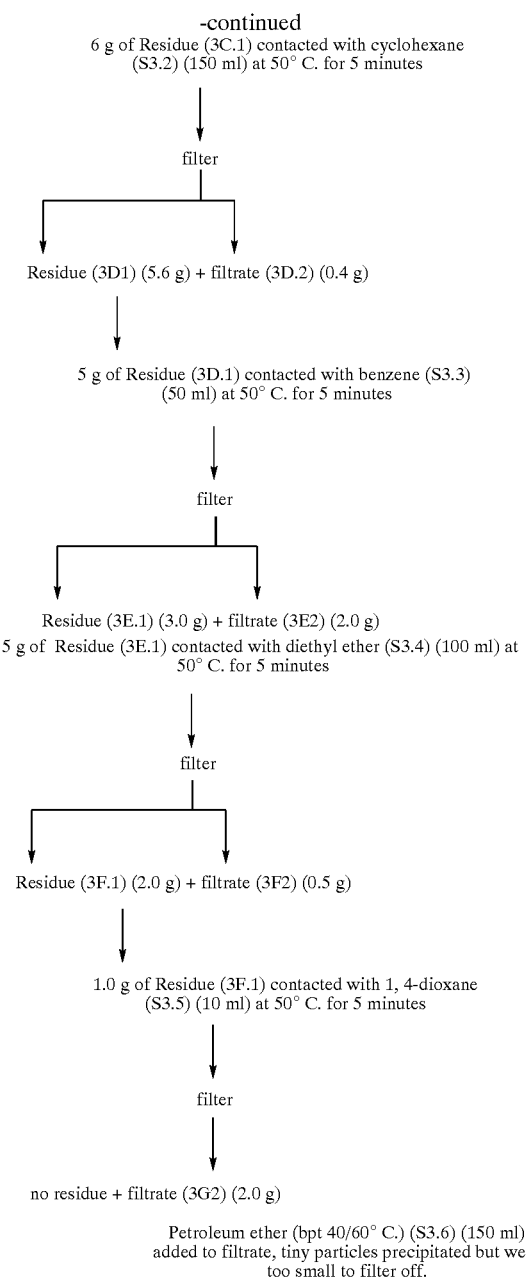

After this stage there remains only solid material which is insoluble in solvents having a polarity of not more than that of petroleum ether. This is considered intractable for the purposes of the present invention which seeks polymers which in addition to transmitting light and being conductive can be fabricated into useful products from solution.

Figure 13:
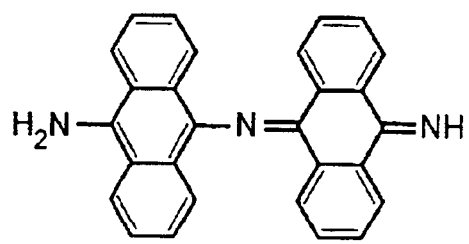
FIG. 13 is the Structure IV referred to herein.
Figure 14:
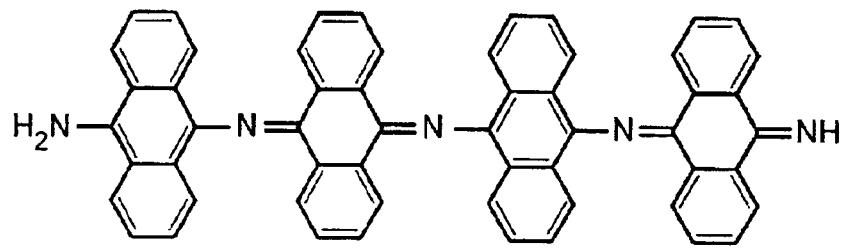
FIG. 14 is the Structure V referred to herein.

The solid residues 3B1 to 3F1 when subjected to FD mass spectra analysis mainly showed a dimer (see Structure IV—FIG. 13) fragmental peak at 397 (100%). Some trimer fragment peaks at 587 (Structure III—FIG. 12) and tetramer fragment peaks (Structure V—FIG. 14) were also present in the spectra.

The extraction process may be made more complete by using, Soxhelet extraction for each of the contacting stages.

A modified extraction process could use just three solvents namely 40/60 petroleum ether $E_t(30)$ 31.0, followed by diethyl ether and then dioxane. These spectra were very clean and showed sharp peaks for oligomeric products. The IR spectra of these residues also gave absorption bands in the range of 1650–1610 cm$^{-1}$ indicating the presence of an imino group. Gel Permeation Chromatography (GPC) analysis revealed that these residues also contained high polymeric products with MW~3000–6000.

The conductivity of each of 3C.1, 3D.1, 3E.1 and 3F.1 was measured using the 4-probe method and a value of $10^{-5}$ Scm$^{-1}$ was found for each sample.

The transmission of 3F.1 was measured and the result was found to be at least 90% transmission at wavelengths from 400 to 1000 nanometers using a sample 15±5 nanometers thick.

Each of 3C.1, 3D.1, 3E.1 and 3F.1 on heating remained solid up to 350° C., above which temperature they started to decompose.

EXAMPLE 4
Polymerisation of DAA with DIA by Fusion Reaction

DAA (0.5 g; 2.4 mmol) was thoroughly mixed with DIA (1.0 g; 4.8 mmol). The intimate mixture was sealed in an evacuated glass tube of 2 cms diameter and 10 cms length. Evacuation was by an oil pump rated to produce a vacuum of 0.1 mm Hg($10^{-1}$). The sealed tube was heated for 4 hours at 220° C. A dark green solid was produced. This was contacted with 800 ml of acetone at 25° C. for 30 minutes and filtered to produce 0.2 g of insoluble residue (G4). The filtrate evaporated to dryness left 0.8 g of a dark sold (G5).

The FD mass peaks of G4 were at:
397 relative intensity 50 indicating the dimer species
586 relative intensity 100 indicating the trimer species
777 relative intensity 20 indicating the tetramer species
968 relative intensity 30 indicating the pentamer species
No monomer peak was observed.

The FD mass peaks of G5 were at:
218 relative intensity 50 indicating the monomer species
397 relative intensity 100 indicating the dimer species
587 relative intensity 95 indicating the trimer species
777 relative intensity 25 indicating the tetramer species
967 relative intensity 43 indicating the pentamer species

EXAMPLE 5A

Example 4 was repeated using equimolar amounts of DAA and DIA and heating at 220° C. for 8 hours. This produced a dark brown solid which was contacted with 200 ml of acetone at 25° C. for 30 minutes and filtered to produce 0.18 g of insoluble residue G6. The filtrate evaporated to dryness left 0.44 g of a dark solid G7.

The FD mass peaks of G6 were at:
586 relative intensity 100 indicating the trimer species
967 relative intensity 73 indicating the pentamer species
1347 relative intensity 20 indicating the heptamer species
No monomer peak was observed.

Figure 18:
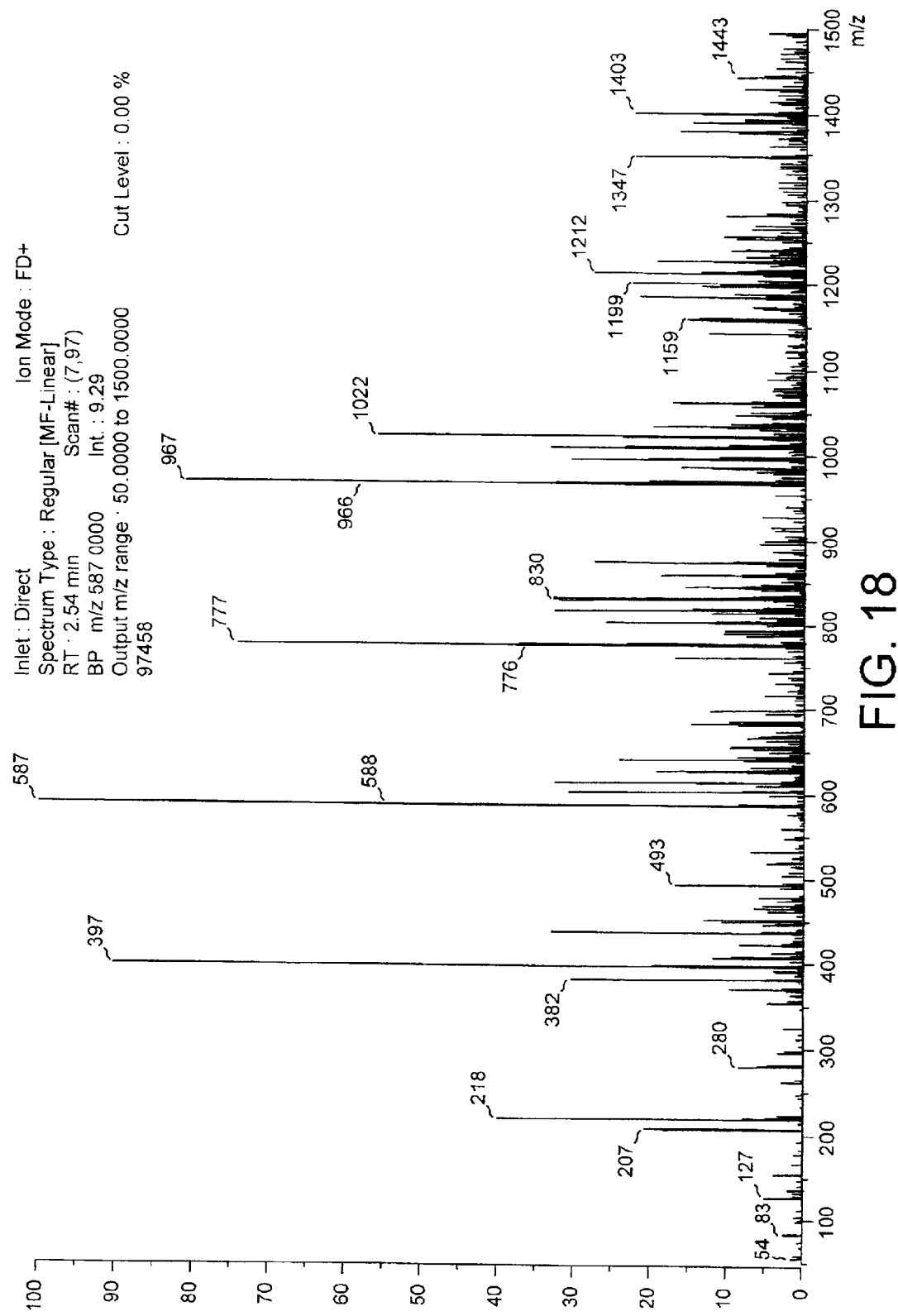
FIG. 18 is a spectra of the field disorption mass spectroscopic analysis of the product G7 of Example 5A.

The FD mass peaks of G7 (see FIG. 18) were at:
397 relative intensity 90 indicating the dimer species
587 relative intensity 100 indicating the trimer species
777 relative intensity 75 indicating the tetramer species
967 relative intensity 82 indicating the pentamer species
1347 relative intensity 25 indicating the heptamer species
No monomer peak was observed.

The FD mass spectra method cannot measure molecular weight above 1500. Oligomers of molecular weight greater than 1500 tend to breakdown to smaller chains so that the lower molecular weight species may be over represented in the FD spectra as compared to their presence in the actual sample.

EXAMPLE 5B

Example 5A was repeated using equimolar proportions of DAA and DIA and a reaction time of 4 hours.

The FD mass peaks of the acetone insoluble portion of the reaction mixture (see FIG. 19) were at:
398 relative intensity 30 indicating the dimer species
587 relative intensity 60 indicating the trimer species
778 relative intensity 85 indicating the tetramer species
967 relative intensity 100 indicating the pentamer species
1158 relative intensity 45 indicating the hexamer species
1348 relative intensity 43 indicating the heptamer species
No monomer peak was observed.

EXAMPLE 6

Example 5 was repeated but using a temperature of 250° C. for 4 hours. The dark brown solid produced was contacted with 400 ml of acetone at 25° C. for 30 minutes which left residue 0.35 g of insoluble material (G8). The filtrate evaporated to dryness left 0.25 of dark solid (G9).

The FD mass peaks of G8 (see FIG. 20) were at:
397 relative intensity 20 indicating the dimer species
586 relative intensity 60 indicating the trimer species
778 relative intensity 35 indicating the tetramer species
967 relative intensity 100 indicating the pentamer species
1158 relative intensity 25 indicating the hexamer species
1347 relative intensity 40 indicating the heptamer species
No monomer peak was observed.

The FD mass peaks of G9 (see FIG. 21) were at:
586 relative intensity 80 indicating the trimer species
778 relative intensity 60 indicating the tetramer species
967 relative intensity 100 indicating the pentamer species
1159 relative intensity 20 indicating the hexamer species
1348 relative intensity 22 indicating the heptamer species
No monomer peak was observed.

When Example 5B was repeated at lower temperatures lower molecular weight species were formed. Thus at 160° C. for 4 hours the predominant species (100 relative intensity) was dimer, whilst in Example 5A (250° C. for 8 hours) it was pentamer for the acetone soluble part of the reaction product, and in Example 5B (250° C. for 4 hours) it was pentamer, and in Example 6 (250° C. for 4 hours) it was pentamer.

EXAMPLES 7 AND 8
Self Polymerisation of DAA

EXAMPLE 7

Example 4 was repeated except that DAA (1.0 g; 4.8 mmol) was used on its own and the heating was at 220° C. for 4 hours. This produced a dark brown solid which was contacted with 800 ml of acetone at 25° C. for 0.5 hours and filtered to produce 0.03 g of an insoluble residue (G10) The filtrate evaporated to dryness left 0.74 g of a dark solid (G11).

The ED mass peaks of G10 (see FIG. 22) were at:
397 relative intensity 20 indicating the dimer species
587 relative intensity 100 indicating the trimer species
778 relative intensity 35 indicating the tetramer species
967 relative intensity 30 indicating the pentamer species
No monomer peak was observed.

The FD mass peaks of G11 (see FIG. 23) were at:
397 relative intensity 60 indicating the dimer species
587 relative intensity 100 indicating the trimer species
778 relative intensity 55 indicating the tetramer species
967 relative intensity 80 indicating the pentamer species
No monomer peak was observed.

EXAMPLE 8

Example 7 was repeated heating at 250° C. for 4 hours. The acetone insoluble reside (G12) weighed 0.13 g. The acetone soluble residue (G13) weighed 0.66 g.

The FD mass peaks of G12 (see FIG. 24) were at:
587 relative intensity 85 indicating the trimer species
778 relative intensity 50 indicating the tetramer species
967 relative intensity 100 indicating the pentamer species
1158 relative intensity 50 indicating the hexamer species
1348 relative intensity 40 indicating the heptamer species
No monomer peak was observed.

The FD mass peaks of G13 (see FIG. 25) were at:
397 relative intensity 55 indicating the dimer species
587 relative intensity 90 indicating the trimer species
778 relative intensity 100 indicating the tetramer species
967 relative intensity 75 indicating the pentamer species
1158 relative intensity 20 indicating the hexamer species
1347 relative intensity 20 indicating the heptamer species
No monomer peak was observed.

When Example 7 was repeated at lower temperatures lower molecular weight species were formed. Thus at 200° C. for 4 hours the predominant species in the acetone soluble part of the reaction mixture was dimer (100), at 200° C. for 12 hours it was tetramer (100). As can be seen from Examples 7 and 8 when the conditions are increased to 220° C. for 4 hours (Example 7) it was trimer and at 250° C. for 4 hours (Example 8) it was pentamer.

EXAMPLE 9
Reaction of DAA with DIA in Glacial Acetic Acid

DAA (0.5 g; 2.4 mmol) and DIA (0.49 g; 2.4 mmol) were suspended in 20 ml of glacial acetic acid and refluxed for 3 hours after which time a dark green precipitate had been produced. This was filtered off, washed with water, and dried in air at 60° C. for at 5 hours producing 0.8 g of a green solid. This was contacted with 200 ml of acetone at 25° C. for 10 minutes and then filtered leaving 80 mg of an insoluble reside (G1).

The FD mass peaks of G1 (see FIG. 26) were at:
588 relative intensity 100 indicating the trimer species
969 relative intensity 55 indicating the pentamer species
1348 relative intensity 15 indicating the heptamer species.
No monomer peak was observed.

EXAMPLE 10
Reaction of DAA with DIA in Pivalic Acid

Example 9 was repeated with the DAA and DIA dissolved in 30 ml of pivalic acid (trimethylacetic acid) the reaction mixture was worked up as in Example 9 (except for washing the solids with acetone after filtering) to produce 0.2 mg of a green solid (G14) soluble in acetone.

An attempt to repeat Example 9 using dimethylacetamide as solvent and dischlorobenzene as solvent failed to produce any reaction product in either case.

As can be seen from a comparison of Example 4 with Example 5 (same temperature, 220° C.) doubling the proportion of DIA did not produce an increase in the amount of higher molecular weight species

EXAMPLES 11 AND 12
Condensation of DAA with Substituted DIA

EXAMPLE 11

Fusion Reaction of DAA with 2-methyl-9,10 Diiminoanthracene (DIA2Me).

Example 5B was repeated using equimolar proportions of DAA (0.47 g: 2.2 mmol) and DIA 2Me (0.5 g: 2.2 mmol), at 220° C. for 4 hours.

The reaction product was worked up in the same way as in Example 5B using 150 ml of acetone. No acetone insoluble residue was produced. The acetone soluble material was evaporated to dryness and left 0.7 g of dark solid (MS1). The expected structure of this polymer is given in FIG. 27.

In order to discuss the possible homo- and copolymer species the DAA moiety will be referred to as A and the DIA 2Me moiety as B.

The solid MS1 was characterised by its IR spectra (KBr disc) $\gamma_{max}$: 3400, 3250, 3060, 1660, 1615 (C=N), 1580, 1375, 1310 cm$^{-1}$;
UV-vis $\lambda_{max}$(0.07 gl$^{-1}$ in DMF): 456 nm;
mass (m/z)(%) FAB: 411 (dimer), 616 (trimer), 806 (tetramer).

The dimer structure is given in FIG. 28. The FD mass spectra (on an enlarged scale) is given in FIG. 29A and on even larger scale in FIG. 29B. The AB species is present at 411 and the BAB species at 616 in FIG. 29A. The BABA species is present at 807 and the ABABAB species is present at 1197 in FIG. 29B.

EXAMPLE 12

Example 11 was repeated using equimolar proportions of DAA (0.39 g: 1.9 mmol) and 2-t-butyl-9,10-diiminoanthracene (DIA 2tB) (0.5 g: 1.9 mmol), at 220° C. for 4 hours. The reaction product was worked up in the same way as in Example 11, being dissolved in 50 ml of acetone and there being no acetone-insoluble residue. The acetone soluble material was evaporated to dryness and washed with pretroleum ether to give a dark solid (MS2). The expected structure of the polymer is given in FIG. 30.

In order to discuss the possible homo- and copolymer species the DAA moiety will be referred to as A and the DIA2tB moiety as C.

The solid MS2 was characterised by its IR spectra (KBr disc) $\gamma_{max}$: 3400, 3260, 3050, 2970, 1615 (C=N), 1580, 1375, 1380 cm$^{-1}$;
UV-vis $\lambda_{max}$(0.05 gl$^{-1}$ in DMF): 460 nm;
mass (m/z)(%) FAB: 453 (dimer), 699 (trimer), 889 (tetramer), 1135 (pentamer).

The dimer structure is given in FIG. 31. The FD mass spectra (on an enlarged scale) is given in FIG. 32A and on an even larger scale in FIG. 32B.

In FIG. 32A the AA species is present at 397, the AC species at 453, the AAA species at 587, the CAC species at 699, the CACA species at 889 and the CACAC species at 1135. In FIG. 32B the CACA species is present at 889 and the CACAC species at 1135.

Figure 15:
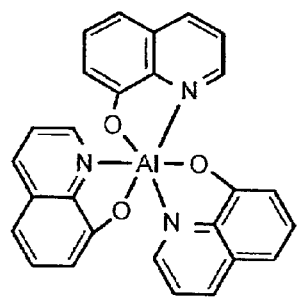
FIG. 15 is the structure of the compound referred to as $Alq_3$ herein.
Figure 16:
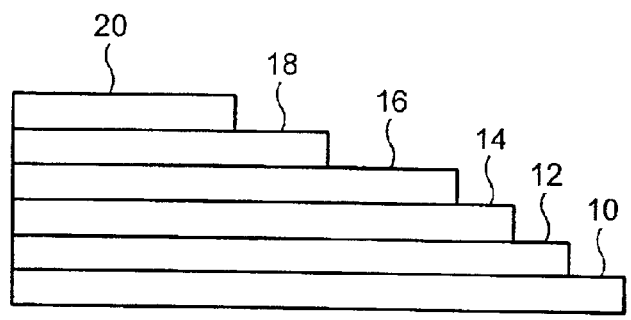
FIG. 16 is a diagrammatic cross section of a device utilising an oligomeric material of the present invention.
Figure 17:
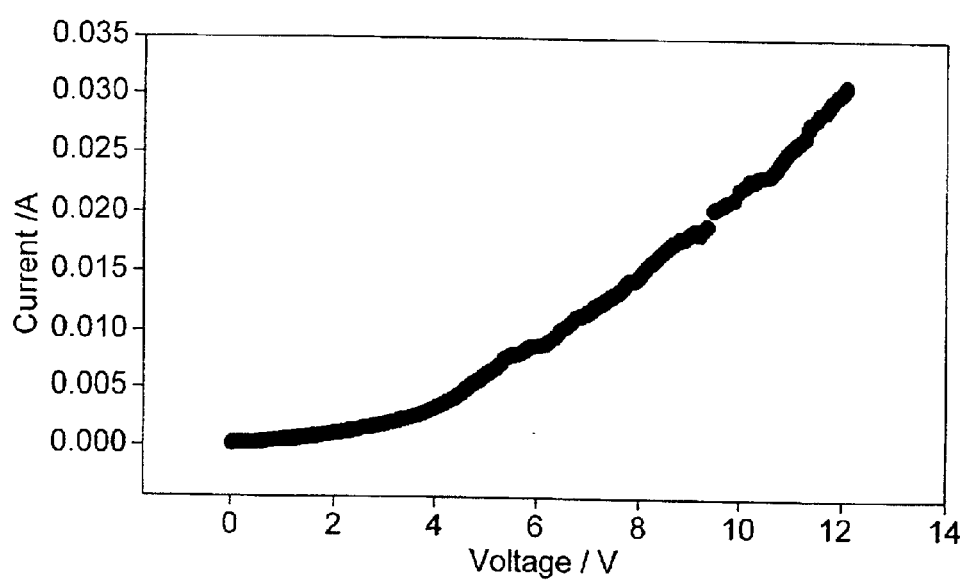
FIG. 17 is a graph of current amps versus voltage inlets for the device described with reference to FIG. 16.

FIG. 16 shows a device which utilises an oligomeric material in accordance with the present invention. Reference 10 denotes a glass substrate layer. Reference 12 denotes an indium-tin-oxide (ITO) layer which provides the positive contact for the device. Reference 14 denotes a layer of oligomeric material of the present invention (made in accordance with Example 5B) which provides a hole transporting function. Reference 16 denotes a layer of Alq$_3$ (see FIG. 15) which is the light emitting layer. Reference 18 denotes a layer of LiF which lowers the work function of the metal electrodes. Reference 20 denotes a layer of aluminium which provides the negative contact for the device. The layers consist of a layer 12 of ITO applied as 5.0 mg/sqcm giving a thickness of about 15 nm, the layer 14 of oligomeric material applied at the same weight and giving the same thickness. The layer 16 is applied at 8.0 mg/sqcm giving a thickness of about 25 nanometers. The layer 18 is applied as 0.5 mg/sqcm giving a thickness of about 2 nm.

The layer 20 of aluminium is applied at about 600 mg/sqcm giving a thickness of 900 nm.

This device is useful as a display screen exhibiting a green colour.

When one applies a voltage across the electrodes the ITO layer 12 injects holes into the layer 14 of the present invention and through into the layer 16 of Alq$_3$.

The cathode 20 emits electrons through the layer 18 of lithium fluoride into the layer 16. The electrons recombine with holes and each such recombination emits a pulse of light.

For effective emission a hole transporting material which provides large numbers of holes is desirable. The materials of the present invention are believed to be effective in this way.

What is claimed is:

1. A method of production of a homopolymer or copolymer or homo-oligomer or co-oligomer product which comprises carrying out a condensation reaction of one or more reactants consisting essentially of at least one reactant selected from the group consisting of diaminoanthracene, substituted diaminoanthracene, diiminoanthracene and substituted diiminoanthracene to produce said homopolymer or copolymer or homo-oligomer or co-oligomer product.

2. A method as claimed in claim 1 characterised in that the condensation reaction is carried out under vacuum in the absence of any solvent.

3. A method as claimed in claim 1 characterised in that the condensation reaction is carried out in an aliphatic carboxylic acid.

4. A method as claimed in claim 2 or claim 3 characterised in that the condensation reaction is carried out between a diaminoanthracene substituted or not with a diimino anthracene substituted or not.

5. A method as claimed in claim 1 characterised in that the substitution is such that the product is a homopolymer or homo-oligomer.

6. A method as claimed in claim 1 characterised in that the substitution is such that the product is a co-polymer or a co-oligomer.

7. A method as claimed in claim 1 characterised in that the diaminoanthracene is a 9,10-diaminoanthracene.

8. A method as claimed in claim 1 characterised in that the sole reactant is diaminoanthracene.

9. A method as claimed in claim 1 characterised in that the only reactants are one or more substituted diaminoanthracenes and diaminoanthracene.

10. A method as claimed in claim 1 characterised in that the only reactants are substituted diaminoanthracenes which may be the same or different.

11. A method as claimed in claim 1 characterised in that the only reactants are diaminoanthracene and diiminoanthracene.

12. A method as claimed in claim 1 characterised in that the only reactants are one or more substituted diaminoanthracenes and diiminoanthracene.

13. A method as claimed in claim 1 characterised in that the only reactants are diaminoanthracene and one or more substituted diiminoanthracenes.

14. A method as claimed in claim 1 characterised in that the only reactants are one or more substituted diaminoanthracenes and one or more substituted diiminoanthracenes.

15. A method as claimed in claim 11 characterised in that the ratio of diaminoanthracene to diiminoanthracene is in the range 5:1 to 1:5.

16. A method as claimed in claim 15, characterised in that the ratio of diaminoanthracene to diiminoanthracene is in the range 3:1 to 1:3.

17. A method as claimed in claim 16, characterised in that the ratio of diaminoanthracene to diiminoanthracene is in the range 2:1 to 1:2.

18. A method as claimed in claim 1 characterised in that the product has the general formula I

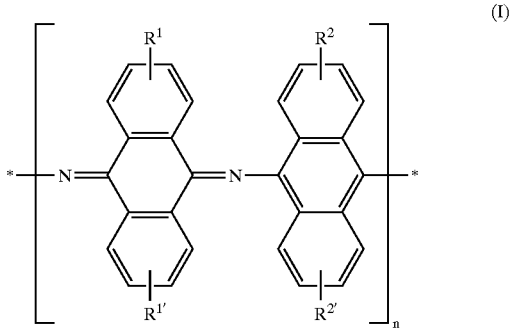

(I)

where, $R^1$ may be the same as or different from $R^{1'}$, which may be the same as or different from $R^2$, which may be the same as or different from $R^{2'}$ and each or $R^1$, $R^{1'}$, $R^2$, and $R^{2'}$ is selected from the group consisting of a hydrogen atom, —CH3, $CH_3CH_2$—, —$OCH_3$, —$OCH_2CH_3$, —$CH_2OCH_3$, —$CH_2OCH_2CH_2OCH_3$, methoxyethoxyethoxymethyl, aryloxymethyl, phenyl, Cl, Br, CN, $NO_2$, —$CH_2COOR'''$, —$CH_2NHCOR'''$ (where R''' is $C_1$–$C_6$ alkyl, a phenyl or biphenyl group), a $C_1$–$C_5$ alkyl group, an aryl group, a benzyl group, an —$SO_3H$ group, a $C_1$–$C_5$ alkoxy group and an $H_2PO_3$ group, and $R^1$ and $R^{1'}$ are different from $R^2$ and $R^{2'}$ and n is an integer ranging from 2 to 100.

19. A method as claimed in claim 1 characterised in that the product has the general formula I

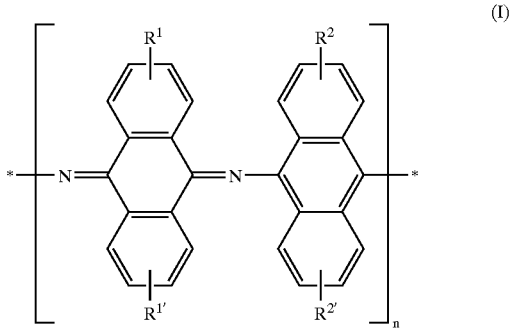

(I)

where, R1 may be the same as or different from $R^{1'}$, and each of $R^1$ and $R^{1'}$ is selected from the group consisting of a hydrogen atom, —$CH_3$, $CH_3CH_2$—, —$OCH_3$, —$OCH_2CH_3$, —$CH_2OCH_3$, —$CH_2OCH_2CH_2OCH_3$, methoxyethoxyethoxymethyl, aryloxymethyl, phenyl, Cl, Br, CN, $NO_2$, —$CH_2COOR'''$, —$CH_2NHCOR'''$ (where R''' is $C_1$–$C_6$ alkyl, a phenyl or biphenyl group), and $R^2$ may be the same or different from $R^{2'}$ and each of $R^2$ and $R^{2'}$ is independently selected from the group consisting of a hydrogen atom, a $C_1$–$C_5$ alkyl group, an aryl group, a benzyl group, an —$SO_3H$ group, a hydroxyl group, a $C_1$–$C_5$ alkoxy group, and an $H_2PO_3$ group, and $R_1$ and $R_1'$ are different from $R_2$ and $R_2'$ and n is an integer ranging from 2 to 100.

20. A method as claimed in claim 18 or claim 19 characterised in that $R^1$ is the same as $R^{1'}$ but is different from $R^2$ and $R^{2'}$ and in that $R^2$ and $R^{2'}$ are the same.

21. A method as claimed in claim 18 or claim 19 characterised in that $R^1$ is the same as $R^{1'}$ and as $R^2$ and $R^{2'}$ but is not hydrogen.

22. A method as claimed in claim 18 or claim 19 characterised in that $R^1$ is different from $R^{1'}$ and $R^2$ is different from $R^{2'}$ and $R^1$ and $R^{1'}$ are both different from $R^2$ and $R^{2'}$.

23. A method as claimed in claim 18 or claim 19 characterised in that $R^1$ and $R^2$ are not hydrogen and in that $R^{1'}$ and $R^{2'}$ are not the same.

24. The method according to claim 18 wherein n is 6 to 20.

25. The method according to claim 19 wherein n is 6 to 20.

26. The method of claim 3 wherein the carboxylic acid is glacial acetic acid or pivalic acid.

27. A method according to claim 2 which comprises fusing 9,10-diaminoanthracene under a vacuum in the absence of a solvent and thereafter completing the condensation reaction.

28. A method according to claim 27 wherein a soluble product is extracted from the condensation product employing acetone as an extractant.

29. A method according to claim 2 which comprises fusing a mixture consisting of diaminoanthracene and diiminoanthracene under a vacuum in the absence of a solvent and thereafter completing the condensation reaction.

30. A method according to claim 29 which comprises extracting the acetone soluble condensation product with acetone and recovering both the acetone extract and the acetone insoluble material.

31. The method according to claim 3 wherein the reactants are a mixture of diaminoanthracene and diiminoanthracenes.

32. The method according to claim 2 which comprises fusing a mixture of diaminoanthracene and 2-t-butyl-9,10-diiminoanthracene and thereafter completing the condensation reaction.

33. The method according to claim 32 wherein the reaction product is subjected to extraction with acetone and the acetone soluble extract is recovered.

34. A method as claimed in claim 2, wherein the at least one reactant is selected from the group consisting of 9,10-diaminoanthracene, substituted 9,10-diaminoanthracene, 9,10-diiminoanthracene and substituted 9,10-diiminoanthracene.

35. A method as claimed in claim 3, wherein the at least one reactant is selected from the group consisting of 9,10-diaminoanthracene, substituted 9,10-diaminoanthracene, 9,10-diiminoanthracene and substituted 9,10-diiminoanthracene.

* * * * *